US012753073B2

(12) United States Patent
Pearse et al.

(10) Patent No.: US 12,753,073 B2
(45) Date of Patent: Oct. 6, 2026

(54) KINETIC ENHANCEMENTS FOR THERMAL PYROLYSIS PROCESS, HYBRID THERMAL-ELECTRIC PYROLYSIS, AND ASSOCIATED SYSTEMS AND METHODS

(71) Applicant: Modern Hydrogen, Inc., Woodinville, WA (US)

(72) Inventors: Alex J. Pearse, Bothell, WA (US); Max Nathan Mankin, Shoreline, WA (US); Yakov Kutsovsky, Arlington, MA (US); Patrick Noble, Seattle, WA (US); Tony S. Pan, Bothell, WA (US); Guido Radaelli, Pleasant Hill, CA (US); Peter Jeremy Scherpelz, Seattle, WA (US)

(73) Assignee: Shell USA Inc., Houston, TX (US)

( * ) Notice: Subject to any disclaimer, the term of this patent is extended or adjusted under 35 U.S.C. 154(b) by 0 days.

(21) Appl. No.: 19/015,407

(22) Filed: Jan. 9, 2025

(65) Prior Publication Data

US 2025/0223158 A1 Jul. 10, 2025

Related U.S. Application Data

(60) Provisional application No. 63/619,667, filed on Jan. 10, 2024, provisional application No. 63/674,770, filed on Jul. 23, 2024.

(51) Int. Cl.
*C01B 3/26* (2006.01)
*C01B 3/24* (2006.01)

(52) U.S. Cl.
CPC ........ *C01B 3/26* (2013.01); *C01B 2203/0261* (2013.01)

(58) Field of Classification Search
CPC ...... C01B 3/26; C01B 2203/0261; C01B 3/24
USPC ........................................................ 422/187
See application file for complete search history.

(56) References Cited

U.S. PATENT DOCUMENTS 9,212,058 B2 12/2015 de Graffenried, Sr.
10,787,362 B2 9/2020 de Graffenried, Sr.
2018/0362863 A1* 12/2018 Ramaseshan ...... C10G 67/0436
2022/0315424 A1 10/2022 Radaelli et al.
2022/0387952 A1* 12/2022 Groenewald ............ C01B 3/24
(Continued)

FOREIGN PATENT DOCUMENTS

WO WO-2021183949 A1 * 9/2021 ............ C10G 51/02

*Primary Examiner* — Huy Tram Nguyen
(74) *Attorney, Agent, or Firm* — Fredrikson & Byron, P.A.

(57) ABSTRACT

Systems and methods that incorporate a kinetic booster component into thermal pyrolysis systems are disclosed herein. For example, a method according to the present technology can include receiving an input flow of the hydrocarbon reactant from a supply of a hydrocarbon reactant, then modifying the input flow to generate a modified input flow. The modified input flow can have a lower activation energy than an unmodified flow and/or can include one or more catalysts for a pyrolysis reaction. The method can then include heating the modified input flow within a pyrolysis chamber of a pyrolysis reactor. The hearting process can drive a pyrolysis reaction in the modified input flow that generates solid carbon and hydrogen gas. The method can then include removing at least a portion of the solid carbon from the hydrogen gas in an output flow from the pyrolysis reactor.

14 Claims, 6 Drawing Sheets

(56) References Cited

U.S. PATENT DOCUMENTS

| | | | | |
|---|---|---|---|---|
| 2023/0144856 | A1* | 5/2023 | Liu | C01C 1/0417 525/338 |
| 2024/0217815 | A1 | 7/2024 | Radaelli et al. | |
| 2025/0189120 | A1 | 6/2025 | Kraemer et al. | |

* cited by examiner

KINETIC ENHANCEMENTS FOR THERMAL PYROLYSIS PROCESS, HYBRID THERMAL-ELECTRIC PYROLYSIS, AND ASSOCIATED SYSTEMS AND METHODS

CROSS-REFERENCE TO RELATED APPLICATION(S)

This application claims priority to U.S. Provisional Patent Application No. 63/619,667, filed Jan. 10, 2024, and U.S. Provisional Patent Application No. 63/674,770, filed Jul. 23, 2024, the disclosures of which are each incorporated herein by reference in their entireties.

TECHNICAL FIELD

The present technology is generally directed to thermal pyrolysis systems, and in some embodiments to systems and methods for providing kinetic enhancements to the thermal pyrolysis of hydrocarbons.

BACKGROUND

Hydrocarbon pyrolysis reactors can produce hydrogen with little or no carbon dioxide emissions. In general, pyrolysis reactors function by heating a hydrocarbon input (also referred to as a "hydrocarbon feedstock," a "hydrocarbon reactant", a "reactant feedstock," "reaction fuel," and/or the like) in an oxygen-free environment to a temperature point (or above) for a pyrolysis reaction, then continue to add heat to encourage the reaction to fully take place. In the pyrolysis reaction, the hydrocarbon splits into various constituents, resulting in an output flow that includes solid carbon and hydrogen gas. The solid carbon can then be filtered from the output flow in a carbon collection system. As a result, pyrolysis reactors can transform the hydrocarbon input (e.g., methane, natural gas, ethane biogas, propane, and/or another suitable hydrocarbon) into combustible hydrogen while separating the carbon from the fuel. Furthermore, hydrogen gas can be used by many systems designed to use methane, natural gas, ethane biogas, propane, and/or another suitable hydrocarbon. Thus, pyrolysis reactors create an opportunity to significantly reduce carbon dioxide, carbon monoxide, and other greenhouse gas emissions by scrubbing the carbon from methane, natural gas, or other hydrocarbons. Accordingly, hydrocarbons (e.g., natural gas) can be de-carbonized before they are combusted or reacted (e.g., to heat a home, in a furnace, in a boiler, in an engine, and the like). Further, the carbon co-product can be incorporated into a variety of downstream applications, such as a partial substitute for bitumen in asphalt production. As a result, the carbon removed from the hydrocarbons can also be productively used to help reduce the carbon footprint of other products. The benefits of pyrolysis systems, however, are limited by their efficiency in converting hydrocarbons into solid carbon and hydrogen gas within a reaction chamber.

Figure 1:
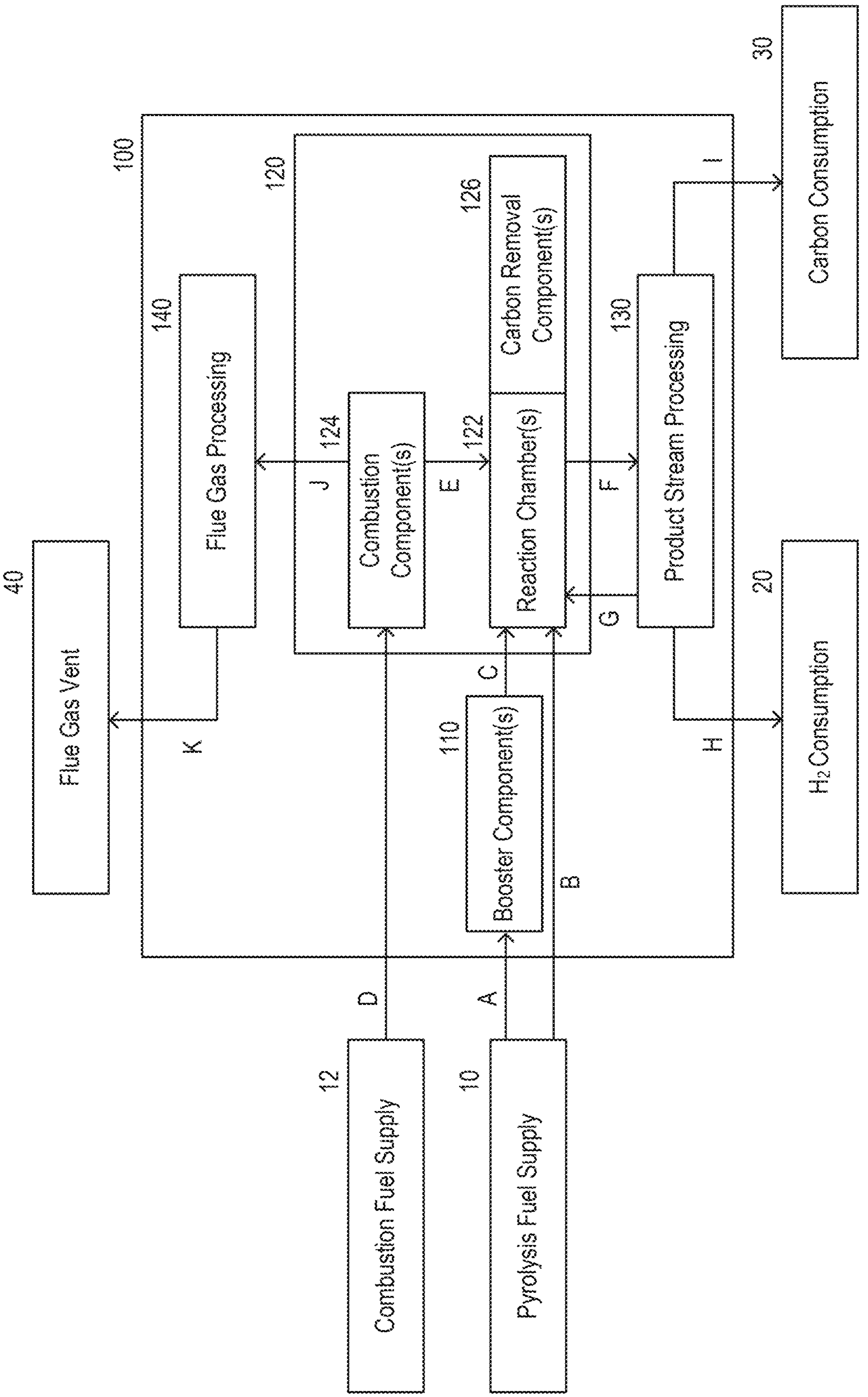
FIG. 1 is a schematic block diagram of a pyrolysis system configured in accordance with embodiments of the present technology.

The drawings have not necessarily been drawn to scale. Similarly, some components and/or operations can be separated into different blocks or combined into a single block for the purpose of discussion of some of the implementations of the present technology. Moreover, while the technology is amenable to various modifications and alternative forms, specific implementations have been shown by way of example in the drawings and are described in detail below. The intention, however, is not to limit the technology to the particular implementations described.

DETAILED DESCRIPTION

Overview

Pyrolysis reactors heat hydrocarbon reactants (e.g., methane, natural gas, ethane, propane, butane, pentane, gasoline, diesel, kerosene, and/or the like) to decompose them into hydrogen gas, solid carbon, and various products. For example, pyrolysis reactors can decompose the methane, ethane, propane, and other hydrocarbon components in natural gas to generate hydrogen gas. In the example of methane, the pyrolysis reaction is:

$$CH4(gas) \rightarrow C(solid)+2H2(gas).$$

The hydrogen gas can then be substituted as the combustion fuel anywhere the natural gas, or other hydrocarbons, would have been used. For example, the hydrogen gas can be consumed by various heating units (e.g., furnaces, water heaters, water boilers, steam boilers, and/or the like), combustion engines, fuel cells and/or power generators (e.g., in a backup power generator), combined heat and power systems, cooking units (e.g., gas stoves), and/or in various other suitable uses. Additionally, or alternatively, the hydrogen can be used in various industrial processes, such as producing various ammonia-based products (e.g., ammonia fertilizers), providing process heat, and/or other chemical processing industries and/or injected back into the natural gas pipeline to partially decarbonize the natural gas in the pipeline. These benefits are particularly strong when a pyrolysis system can be deployed to generate hydrogen gas for local consumption, allowing a hydrogen consumer to take advantage of existing natural gas grids. Further, the solid carbon can be collected and used in various downstream applications. Purely by way of example, the solid carbon product can partially replace binders in asphalt products, thereby effectively sequestering the carbon from the hydrocarbon reactant. As a result, the products from hydrocarbon pyrolysis can help reduce the greenhouse gas emissions associated with multiple different industries.

The benefits of hydrocarbon pyrolysis, however, are limited by a pyrolysis system's efficiency and overall hydrogen output. For example, if the energy input required to facilitate pyrolysis requires carbon emissions that are greater than the carbon emission reduction associated with the hydrogen gas and solid carbon produced, the pyrolysis reaction is carbon positive. The required input energy also results in engineering complications. For example, thermal pyrolysis systems often require high temperatures (e.g., greater than 1000 degrees Celsius (° C.)) and/or other extreme conditions (e.g., high pressures) to achieve desirable efficiencies and/or production rates. In addition to complicating engineering designs, the extreme conditions can make the pyrolysis systems too dangerous to deploy in a wide variety of settings. That is, the extreme conditions can prevent the pyrolysis systems from being deployed to generate hydrogen gas for local consumption (e.g., residentially, in commercial buildings, at manufacturing facilities, and/or the like).

Systems and methods for improving the energy efficiency, operational conditions, and/or output of pyrolysis systems are disclosed herein. For example, as discussed in more detail below, a method for operating a pyrolysis system according to the present technology can include receiving an input flow of a hydrocarbon reactant (e.g., methane, natural gas, ethane biogas, propane, and/or another suitable hydrocarbon) from a supply of a hydrocarbon reactant (e.g., a natural gas utility line) and modifying the input flow. The modifications can include directing the input flow and/or a portion of the input flow through one or more kinetic boosters to increase an efficiency of thermal pyrolysis and/or an output from a pyrolysis reactor. As discussed in more detail below, a kinetic booster is a system or component that modifies the incoming hydrocarbon reactant to help reduce the pyrolysis system's input energy requirements and/or to increase a conversion rate of the pyrolysis system. For example, the kinetic booster can modify the hydrocarbon reactants chemical composition using a fraction of the total system input energy to help facilitate the completion of a pyrolysis reaction in a thermal pyrolysis reactor. In another example, the kinetic booster can dope the flow of the incoming hydrocarbon reactant to help facilitate the completion of the pyrolysis reaction in the thermal pyrolysis reactor. Once the input flow is modified, the method includes heating the modified input flow within a pyrolysis chamber of a pyrolysis reactor. The heating process drives a pyrolysis reaction in the modified input flow that generates an output of solid carbon and hydrogen gas (and/or various byproducts and/or non-reacted hydrocarbons). The method then includes removing at least a portion of the solid carbon from the output flow to purify the hydrogen gas in the output flow and/or to capture the carbon for downstream uses.

The modifications from the kinetic boosters can have a variety of operational mechanisms. For example, some boosters (e.g., plasma chambers) add energy to the hydrocarbon reactant (sometimes referred to herein as a "reactant feedstock", a "hydrocarbon feedstock," a "hydrocarbon reactant", a "reaction fuel," and/or the like) in the input flow. The initial injection of energy can reduce the energy that the pyrolysis system must add to convert the hydrocarbon reactant into hydrogen and carbon. Additionally, or alternatively, the plasma can help convert a portion of the hydrocarbon reactant into hydrogen and carbon and/or into an intermediate species with a lower activation energy. In a specific, non-limiting example, the plasma can help convert methane ($CH_4$) into an intermediate species (e.g., $CH_3$*+H*, sometimes also referred to herein as "radicals"), which can have a lower activation to further decompose into hydrogen gas and carbon. Further, in some embodiments, the plasma boosters dope the hydrocarbon reactant with one or more gasses, such as air, oxygen ($O_2$), nitrogen ($N_2$), carbon dioxide ($CO_2$), and/or the like (sometimes referred to herein as "gaseous catalysts") to help catalyze the hydrocarbon reactant.

In another example, the kinetic boosters can expose the hydrocarbon reactant to catalysts to help reduce the activation energy. For example, exposure to non-oxidative materials can help reduce the activation energy of the hydrocarbon reactant. Examples of suitable non-oxidative catalysts include tungsten (W), Molybdenum (Mo), Platinum (Pt), Ruthenium (Ru), Rhodium (Rh), Iridium (Ir), Iron (Fe), Nickel (Ni), Copper (Cu), Manganese (Mn), Zinc (Zn), and/or Bismuth (Bi). In some embodiments, the hydrocarbon reactant is exposed to a fluidized bed of the non-oxidative catalysts. In some such embodiments, one or more particulates of the non-oxidative catalysts are carried into the thermal pyrolysis reactor and act as nucleation sites for the solid carbon to form on during the pyrolysis reaction. In some embodiments, the kinetic boosters expose the hydrocarbon reactant to a heated form of the non-oxidative catalysts to help add energy and/or reduce the activation energy of the hydrocarbon reactant. For example, the catalysts can be coated onto a ceramic component (e.g., a ceramic honeycomb) and heated, then the hydrocarbon reactant can be flowed through the ceramic component.

In yet another example, the kinetic boosters can dope the hydrocarbon reactant to help catalyze the pyrolysis reaction. For example, the kinetic boosters can dope the hydrocarbon reactant with carbon particulates, polyaromatic molecules (e.g., larger and/or more reactive hydrocarbons such as ethylene, acetylene, propane, propene, ethane, ethene, alkanes, and/or the like; and/or various intermediate species), oxidizing catalysts (e.g., water, steam, air, and/or methanol), and/or the like. Particulate doping (e.g., with generated carbon particles) can provide fluidized nucleation sites for the pyrolysis reaction that both reduce the activation energy for pyrolysis, improve heat transfer, and/or help ensure that solid carbon is carried out of the reaction chamber, thereby reducing the chance of fouling and improving the efficiency of the pyrolysis reactor.

The carbon particulates used as a catalyst can be recycled from an output of the pyrolysis system. In some embodiments, the carbon particulates used as a catalyst are recycled from an output of the pyrolysis system. For example, a carbon separation system coupled to an output of the pyrolysis system can direct carbon particulates in the output to a mixer to modify the input stream. In some embodiments, the carbon particulates used as a catalyst are generated by an upstream pyrolysis reaction (e.g., within a plasma reactor). The polyaromatic molecules can experience the pyrolysis reaction at lower temperatures, thereby helping jumpstart the pyrolysis reaction for the hydrocarbon reactant at a lower temperature. The oxidative catalysts can help reduce the activation energy of the pyrolysis reaction by providing a reaction species for other molecules in the input flow. Additionally, or alternatively, the presence of oxygen can help reduce the chance that organic compounds (e.g., polycyclic aromatic hydrocarbons (PAHs)) are present in an output of the pyrolysis system by helping drive the pyrolysis reaction to completion. Further, the presence of oxygen can help remove solid carbon from the pyrolysis chamber to protect against coking. However, oxygen catalysts generate carbon monoxide (CO) and/or ($CO_2$), which result in an increase in the greenhouse gas emissions associated with the pyrolysis system.

In each of the examples above, the modifications to the input flow can help accelerate reaction kinetics and/or lower required pyrolysis temperatures. Said another way, while input heat is still doing significant work for the pyrolysis reaction, the booster modifications reduce the amount of input heat required. As a result, the booster modifications can help increase an overall efficiency a pyrolysis system at a given operating temperature and/or footprint and/or can help increase the overall output of hydrogen and/or carbon from the pyrolysis system. Additional benefits can include lowering the rate of hard carbon formation (e.g., via coking within a pyrolysis chamber), making carbon easier to remove from the pyrolysis system (thereby reducing stress associated with carbon removal, reducing temperature drops during carbon removal, and/or reducing downtime associated with carbon removal), reducing required temperatures in the pyrolysis reactor (thereby improving safety of the pyrolysis system), lowering the amount of intermediate byproducts in the product stream (e.g., PAHs), and/or simplifying an overall design of the pyrolysis reactor. Still further benefits of the inclusion of boosters into the pyrolysis system include providing a system with operating parameters that can dynamically altered to control an output of the pyrolysis system (e.g., to maximize hydrogen output, to maximize system efficiency, to minimize energy consumption, alter the distribution of energy provided via combustion versus electricity, and/or the like).

For case of reference, the pyrolysis systems, and the components thereof, are sometimes described herein with reference to top and bottom, upper and lower, upwards and downwards, and/or horizontal plane, x-y plane, vertical, or z-direction relative to the spatial orientation of the embodiments shown in the figures. It is to be understood, however, that the pyrolysis systems, and the components thereof, are can be moved to, and used in, different spatial orientations without changing the structure and/or function of the disclosed embodiments of the present technology.

Further, although primarily discussed herein in the context of boosting hydrogen production from a hydrocarbon pyrolysis system, one of skill in the art will understand that the scope of the invention is not so limited. For example, the systems and methods disclosed herein can also be used to boost production of carbon and/or other co-products of the hydrocarbon pyrolysis and/or can be modified for use in various other pyrolysis systems. In a specific, non-limiting example, the techniques for recycling solid particulates of a co-product from a pyrolysis reaction, discussed in more detail below, can be adapted for use in various other pyrolysis systems to help provide a kinetic boost to those pyrolysis systems. Accordingly, the scope of the invention is not confined to any subset of embodiments, and is confined only by the limitations set out in the appended claims.

The embodiments of the present technology introduced above provide systems and methods for helping boost the efficiency of pyrolysis system without introducing components that must be stopped periodically. As a result, a pyrolysis system according to the present disclosure can be operated continuously (or generally continuously) without needing to switch to a backup reactor and/or without needing to factor in downtime. As used herein, "continuous" operation can refer to generally continuous operation of the pyrolysis system, which can include operating the pyrolysis system without needing to pause to clean or otherwise empty the reaction chamber for periods of at least 3 hours, 6 hours, 12 hours, 24 hours, 48 hours, 72 hours, 1 week, 1 month, 6 months, and/or longer periods. Continuous operation can include operation of the pyrolysis system that periodically pauses, e.g., when demand for hydrogen gas goes down (or goes to zero), and/or pauses to allow components of the pyrolysis reactor to be serviced (e.g., for maintenance), and/or pauses when particular reaction conditions need to be met.

The continuous operation without downtime and/or thermal cycling (e.g., switching to the backup reactor) can further help reduce costs associated with the pyrolysis reactors because the continuous pyrolysis system does not require multiple pyrolysis reactors to allow one pyrolysis reactor to be reset while another reactor is operating. Additionally, or alternatively, continuous operation can lower operating expenses associated with a pyrolysis system because the capital expense has a high utilization fraction. Additionally, or alternatively, continuous operation can allow the continuous pyrolysis system to fit into a smaller footprint (e.g., because the system does not require thermal cycling to remove carbon).

Further, the embodiments of the present technology introduced above can help allow a pyrolysis system to operate without requiring onsite utilities like high-pressure and/or high-temperature water or steam. In turn, the non-requirement for high pressure or temperature water or steam enables the continuous pyrolysis system to be operational at non-industrial sites, such as within or located at a single-family household, within or located at an apartment building, within or located at a commercial building (e.g., an office building, a retail store, restaurant, and/or the like), at an industrial site without high-pressure steam or water, and/or the like. Additionally, the non-requirement for high-pressure or temperature water or steam can reduce the operational costs, capital costs, and/or footprint associated with the continuous pyrolysis system.

Additionally, or alternatively, the embodiments of the present technology introduced above can allow a pyrolysis system to operate without requiring a consumable carbon scaffold, without the direct formation of CO or CO2 (thereby enabling the production of low (or negative) carbon intensity (CI) hydrogen), and/or operate at higher thermal efficiencies than reactor systems that require downtime. Still further, the embodiments of the present technology introduced above can allow a pyrolysis system to be amenable to a range of pyrolysis geometries, such as pyrolysis contained in individual tubes that are heated externally, annular pyrolysis zones that are heated internally, and/or a system that has parallel combustion tubes with the pyrolysis zone between these tubes Additional details on various aspects of the systems and methods for boosting production from a pyrolysis system are set out below with reference to FIGS. 1-6.

DESCRIPTION OF THE FIGURES

FIG. 1 is a schematic block diagram of a pyrolysis system 100 configured in accordance with embodiments of the present technology. In the illustrated embodiments, the pyrolysis system 100 includes a booster component 110 and a pyrolysis reactor 120 operably coupled to the booster component 110. The pyrolysis system 100 also includes a product stream processing component 130 and a flue gas processing component 140 each operably coupled to the pyrolysis reactor 120.

The booster component 110 is coupled to a pyrolysis fuel supply 10 to receive a hydrocarbon reactant (e.g., natural gas, pure methane, gasoline, diesel, biomass, ethane biogas, organic and semi-organic waste material, and/or the like) along a first path (A). For example, the first path (A) can include one or more valves (or another suitable flow control component) and pipes to couple the booster component 110

(and/or any components thereof) to a natural gas supply or pipeline (and/or any other supply of the pyrolysis fuel).

The pyrolysis reactor 120 includes a reaction chamber 122 and a combustion component 124. The reaction chamber 122 can be operably couplable directly to the pyrolysis fuel supply 10 to receive the hydrocarbon reactant along a second path (B). Similar to the first path (A), the second path (B) can include one or more valves (or another suitable flow control component) and pipes to couple the reaction chamber 122 to a natural gas supply or pipeline (and/or any other supply of the pyrolysis fuel). Additionally, or alternatively, the reaction chamber 122 can be operably couplable to the booster component 110 along a third path (C) to receive a modified flow of the hydrocarbon reactant. As discussed in more detail below, the modified flow can be preheated by the booster component 110, can be exposed to one or more non-oxidative catalysts, can include one or more doping agents (e.g., solid particulates such as carbon, polyaromatic species, oxidative catalysts, and/or the like), and/or can include partially reacted hydrocarbon molecules. In some embodiments, the reaction chamber receives a mixture of hydrocarbon reactants both from the pyrolysis fuel supply 10 and the booster component 110. In some such embodiments, the booster component 110 includes a feedstock mixer (or other mixing component) to combine a modified hydrocarbon reactant and/or a catalyst with a an unmodified hydrocarbon reactant.

As further illustrated in FIG. 1, the combustion component 124 is fluidly couplable to a combustion fuel supply 12 to receive a combustion fuel along a fourth path (D) (e.g., one or more valves and/or fluid pipelines couplable to the fuel supply 12). The combustion fuel can include various hydrocarbons (e.g., natural gas, pure methane, ethane biogas, gasoline, diesel, and/or the like) and/or hydrogen gas from a previous pyrolysis reaction in the reaction chamber 122. The combustion component 124 is thermally coupled to the reaction chamber 122 to receive heat along a fifth path (E).

The reaction chamber 122 can then use heat received from the combustion component 124 to raise the temperature of the incoming hydrocarbon reactant and supply the required activation energy for hydrocarbon pyrolysis. As a result, the reaction chamber 122 causes a pyrolysis reaction that breaks the hydrocarbon reactant into hydrogen gas and carbon. Returning to the natural gas example above, the reaction chamber 122 can use heat from the combustion component 124 to heat the hydrocarbon reactant to (or above) about 650° C. to start the pyrolysis reaction.

In some embodiments, the combustion component 124 includes one or more burners that receive and combust a combustion fuel. In some embodiments, the pyrolysis reactor 120 is a combined combustion and pyrolysis reactor ("CCP reactor") that provides continuous combustion and pyrolysis for any suitable amount of time. For example, the combustion component 124 can include one or more burners and a combustion chamber. Further, the reaction chamber 122 can be coupled to the combustion component 124 through a heat exchanger, a shared wall between the reaction chamber 122 and the combustion chamber, a flow of flue gas from the combustion component 124 in contact with a wall of the reaction chamber 122, and/or any other suitable mechanism. In another example, the combustion component is integrated with the reaction chamber 122. For example, the combustion component 124 can include a burner positioned to combust the combustion fuel and direct the flue gas directly through the reaction chamber 122. In such embodiments, the combustion component 124 (and/or any other suitable component of the pyrolysis reactor) can control the amount of oxygen available in the reaction chamber such that all (or almost all) of the available oxygen is consumed combusting the combustion fuel supply. That is, the combustion component 124 (and/or another suitable component) can help make sure no oxygen is present to disrupt the pyrolysis reaction. Additional details on examples of suitable pyrolysis reactors, and the thermal coupling between the reaction chamber 122 and the combustion component 124, are set out in U.S. Patent Publication No. 2021/0380407 to Ashton et. al, U.S. Patent Publication No. 2022/0315424 to Ashton et. al, and U.S. Patent Publication No. 2022/0120217 to Ashton et. al, and U.S. Patent Publication No. 2022/0387952 to Groenewald et al., each of which is incorporated herein by reference in their entireties.

Further, it will be understood that while specific examples of the pyrolysis reactor 120 have been discussed herein, the technology is not so limited. For example, in some embodiments, the reaction in the reaction chamber 122 can be driven by a thermal coupling to another suitable component (e.g., a home heating device, such as a furnace, water boiler, steam boiler, plasma device, and/or the like) coupled to the hydrocarbon reactant (e.g., in and/or upstream of the reaction chamber 122); a catalytic heater coupled to the hydrocarbon reactant; an electrical heating component coupled to the hydrocarbon reactant; a microwave component operably coupled to the hydrocarbon reactant (e.g., to microwave gas in the reaction chamber 122); and/or any other suitable component. In a specific, non-limiting example, the reaction chamber 122 can include molten salt that is heated by electrical heaters and/or hot gas from another suitable component and/or a fluidized bed reactor with or without a catalyst. In this example, the molten salt can heat the incoming hydrocarbon reactant to cause the pyrolysis reaction.

As further illustrated in FIG. 1, the pyrolysis reactor 120 also includes a carbon removal component 126 that is operably coupled to the reaction chamber 122. The carbon removal component 126 (sometimes also referred to herein as a "carbon scraper component," a "trimmer," and/or the like) can help address carbon buildup within the reaction chamber 122 by actuating (e.g., linearly and/or rotationally) into and/or within the reaction chamber. More specifically, the carbon removal component can include one or more heads that scrape, scrub, abrade, scratch, and/or otherwise dislodge (referred to collectively using "scrape" herein) solid carbon from the walls of the reaction chamber 122 as the carbon removal component 126. Further, the carbon removal component 126 can include one or more sealing devices that allow the scraping heads to be actuated from outside of the reaction chamber 122 without letting any reaction gasses (e.g., pyrolysis fuel gas, hydrogen gas, byproduct gasses, combustion gas, combustion flue gas, and/or the like) escape from the reaction chamber 122. As a result, the carbon removal component 126 can help remove carbon from the reaction chamber 122 without pausing or otherwise disrupting operation of the pyrolysis reactor 120. Additional details on examples of suitable carbon removal components, sealing devices, and associated systems and methods are set out in U.S. patent application Ser. No. 18/925,643 to Ritchey et. al, filed Oct. 24, 2024, the entirety of which is incorporated herein by reference.

As further illustrated in FIG. 1, the reaction chamber 122 (or another suitable component of the pyrolysis system 100) can direct an output from the reaction chamber 122 (sometimes referred to herein as a "product stream") into the product stream processing component 130 along a sixth flow path (F). The product stream processing component 130 includes various product separators, compressors, gas processors, and/or the like to separate products in the output flow from each other and, in some embodiments, condition the separated products for downstream uses. For example, the product stream processing component 130 can include one or more carbon separation components (e.g., a cyclone separator, one or more filters (e.g., a mesh filter, a baghouse filter, and/or the like), a gas-liquid separator, and/or any other suitable separator) to remove carbon (and other particulates) from the gasses in the output flow. The gasses can then be filtered (e.g., via one or more organic compound separation components, one or more gas separators, and/or the like) and/or conditioned to separate the hydrogen gas (and/or unreacted hydrocarbons) from other gasses in the output flow. The resulting hydrogen can then be conditioned (e.g., compressed, cooled, filtered again, and/or the like) and directed along a seventh flow path (H) to a hydrogen consumption component 20.

The hydrogen consumption component 20 can include (or be coupled to) a variety of end locations. For example, the hydrogen consumption component 20 can include (or be coupled to) a hydrogen storage (or local consumption point, such as the combustion component 124, a heating unit coupled to the pyrolysis system 100, a power generation component coupled to the pyrolysis system 100, and/or the like). The hydrogen storage can allow the hydrogen gas to be consumed locally as needed (e.g., during peak demand for power, to augment and/or replace a hydrocarbon gas to drive the combustion component 124, and/or the like). As used herein, local consumption can mean within the same building as the pyrolysis system 100, within the same property as the pyrolysis system 100, within a half mile of the pyrolysis system 100, within about 5 miles of the pyrolysis system 100, within an endpoint for public utilities (e.g., the consumption does not require any public utility line or public transportation means between the pyrolysis system 100 and the point of consumption), and/or the like. In another example, the hydrogen consumption component 20 can include (or be coupled to) a hydrogen grid (e.g., a public utility grid, such as a dedicated hydrogen grid) and/or into the natural gas grid. In some embodiments, the hydrogen consumption component 20 can provide hydrogen gas to the combustion component 124 to supplement, augment, and/or replace other combustion fuels (e.g., to replace, fully or in part, natural gas as the combustion fuel). In embodiments where the hydrogen gas is directed into the natural gas grid, a volume of the hydrogen directed into the natural gas grid can be controlled such that the hydrogen gas is less than about 20% of the gas, by volume, in the natural gas pipeline. Limiting the amount of hydrogen gas in the natural gas pipeline can limit risks associated with the hydrogen gas in the natural gas grid, while also helping to partially decarbonize the natural gas grid. In another example, the hydrogen consumption component 20 can include (or be coupled to) a supply grid for hydrogen-powered electronics, vehicles, machines, and/or the like. For example, the supply grid can provide the hydrogen gas to fuel cell electric vehicles (FCEVs), $H_2$ internal combustion engines ($H_2$ ICE) powered vehicles, and/or the like. In yet another example, the hydrogen consumption component 20 can include (or be coupled to) a combined heat and power device (e.g., rather than to the hydrogen storage) to be consumed. Examples of suitable combined heat and power devices are disclosed in U.S. Patent Publication No. 2022/0387952 to Groenewald et. al, and U.S. Patent Publication No. 2022/0120217 to Ashton et. al, each of which is incorporated herein by reference. Additionally, or alternatively, the hydrogen consumption component 20 can include (or be coupled to) a power generation device (e.g., a combustion engine, thermionic converter, linear generator, fuel cell, and/or other suitable power generator). In yet another example, the hydrogen consumption component 20 can include (or be coupled to) a chemical processing component that uses the hydrogen gas for various other chemical processing operations.

Similarly, the product stream processing component 130 can direct the carbon removed from the product stream along an eighth flow path (I) toward a carbon consumption component 30 (or carbon processing component). The carbon consumption component can use or store the carbon to help ensure that the carbon is not eventually released as carbon dioxide. That is, the carbon consumption component 30 can help finalize the carbon capture from the pyrolysis fuel. In various embodiments, the carbon consumption component 30 can include a collection bin, a processing component that prepares the carbon to be used (or uses the carbon) in various applications. Purely by way of example, the carbon consumption component 30 can prepare the carbon to be used as a binder replacement and/or supplement for asphalt products.

In some embodiments, discussed in more detail below, the product stream processing component 130 directs at least a portion of the solid carbon back to other components of the pyrolysis system 100. For example, the product stream processing component 130 can direct carbon particulates back to the booster component 110 to be added to an incoming flow of hydrocarbon reactant as a catalyst. In such embodiments, the carbon particulates provide fluidized nucleation sites for carbon during pyrolysis reactions within the reaction chamber 122. The nucleation sites can help jump-start the pyrolysis reaction, thereby reducing the activation energy required for the pyrolysis reaction. Additionally, or alternatively, the fluidized nature of the carbon particulates can help ensure that the resulting solid carbon is carried out of the reaction chamber 122 (e.g., as opposed to precipitating onto walls of the reaction chamber 122 and causing fouling therein). For example, the carbon particles flowing into the reaction chamber 122 can have a substantially higher (e.g., about 10×, about 100×, about 1000×, and/or about 10000×) surface area than the walls of the reaction chamber 122. As a result, new carbon is primarily collected on existing carbon particles that are in a fluidized gas-solid stream in the reaction chamber 122. Said another way, the multi-stage arrangement of the booster component 110 and the reaction chamber 122 can help reduce the amount of carbon that deposits on the walls of the reaction chamber 122, thereby lowering the relative rate of fouling of the walls of the thermal reactor. As a result, the multi-stage arrangement can help increase an efficacy and/or efficiency of the pyrolysis reactor 120 and/or help reduce downtime needed to clean the reaction chamber 122.

Further, in some embodiments, the product stream processing component 130 includes one or more heat exchangers and/or recuperators to absorb heat from the product stream. For example, the product stream processing component 130 can absorb heat from the product stream and transfer the heat to incoming pyrolysis fuel in the first-third flow paths (A)-(C) and/or incoming combustion fuel in the fourth flow path (D) to preheat the incoming gasses. The preheating process can help increase an efficiency of the pyrolysis reactor 120 and/or a completeness of the pyrolysis reaction within the reaction chamber 122. Additional details on examples of suitable recuperators are disclosed in U.S.

Patent Publication No. 2022/0315424 to Ashton et. al and U.S. Patent Publication No. 2022/0120217 to Ashton et. al, each of which is incorporated herein by reference. Additionally, or alternatively, the heat can be directed to one or more heating units (e.g., an HVAC unit, water heater, steam boiler, and/or the like), a power generation device (e.g., a combined heat and power component, a thermionic device, thermoelectric device, fuel cell, thermoacoustic device, and/or any other suitable power generator), and/or the like.

As further illustrated in FIG. 1, the combustion component 124 (or another suitable component of the pyrolysis system 100) can direct an output from the combustion component 124 (e.g., flue gas, when separate from the product stream) into the flue gas processing component 140 along a ninth flow path (J). The flue gas processing component 140 can process (e.g., filter, clean (e.g., absorb carbon dioxide and/or other gasses from), compress, decompress, cool, and/or the like) before directing the flue gas to a flue gas vent 40 (e.g., an exhaust system) along a tenth flow path (K). For example, similar to the discussion above, the flue gas processing component 140 can include one or more heat exchangers. The heat exchangers can absorb at least a portion of the heat remaining in the flue gas to recycle the heat. For example, the flue gas processing component 140 (or another suitable component) can direct heat from the heat exchanger into contact with incoming air for the combustion component 124. As a result, the heat exchanger can preheat the incoming air, thereby reducing the temperature difference between the incoming air and the combustion temperature. As a result, the combustion component 124 does not need to raise the temperature of the incoming air as far to initiate combustion, thereby improving the efficiency of the combustion component 124. In another, similar example, the flue gas processing component 140 can be coupled to the combustion fuel supply 12 to receive the combustion fuel. In this example, the heat exchanger in the flue gas processing component 140 can preheat the combustion fuel upstream from the combustion component 124. As a result, the combustion component 124 does not need to raise the temperature of the incoming combustion fuel as far to initiate combustion, thereby improving the efficiency of the combustion component 124. In yet another example, the flue gas processing component 140 can recycle the heat for an external appliance, such as a heating unit (e.g., an HVAC unit, water heater, steam boiler, and/or the like), a power generation device (e.g., a combined heat and power component, a thermionic device, thermoelectric device, thermoacoustic device, a fuel cell, and/or any other suitable power generator), and/or the like.

In various embodiments, the pyrolysis system 100 can omit one or more of the components discussed above and/or include one or more additional components. For example, in embodiments where the combustion component 124 includes a burner positioned to direct the flue gas directly through the reaction chamber 122, the flue gas is mixed with the product stream. Accordingly, in this example, the pyrolysis system 100 can omit the separate flue gas processing component 140 and instead integrate any needed functionality into the product stream processing component 130 (e.g., adding a water vapor condenser and/or a carbon dioxide absorber to the product stream processing component 130 to separate components of the flue gas from the product stream). In another example, the pyrolysis system 100 can include a variety of additional processing components downstream from the pyrolysis reactor 120 to help separate and/or process the product stream (e.g., to help separate byproducts from the pyrolysis reaction, to further condition the hydrogen gas for consumption at an endpoint, and/or the like).

In yet another example, although not illustrated in FIG. 1, it will be understood that the pyrolysis system 100 can include a controller operatively coupled to any suitable component of the pyrolysis system 100 to control (or help control) the operation thereof. For example, the controller can include a memory and processor that are coupled to the reaction chamber 122 and/or combustion component 124 to help control the amount and/or operating parameters of the pyrolysis reaction, the carbon removal component 126 to help control the actuation cycles of the carbon removal component 126, and/or the like.

In yet another example, it will be understood that the pyrolysis system 100 can alternative ratios of components. Purely by way of example, the pyrolysis reactor 120 can include multiple reaction chambers 122 and/or multiple combustion components 124. The multiple reaction chambers 122 can each be coupled to a single booster component 110. Alternatively, the pyrolysis system 100 can include multiple booster components 110. The multiple booster components 110 can be coupled to the reaction chambers 122 in a 1:1 ratio and/or can include multiple booster components 110 per reaction chamber 122.

Figure 2:
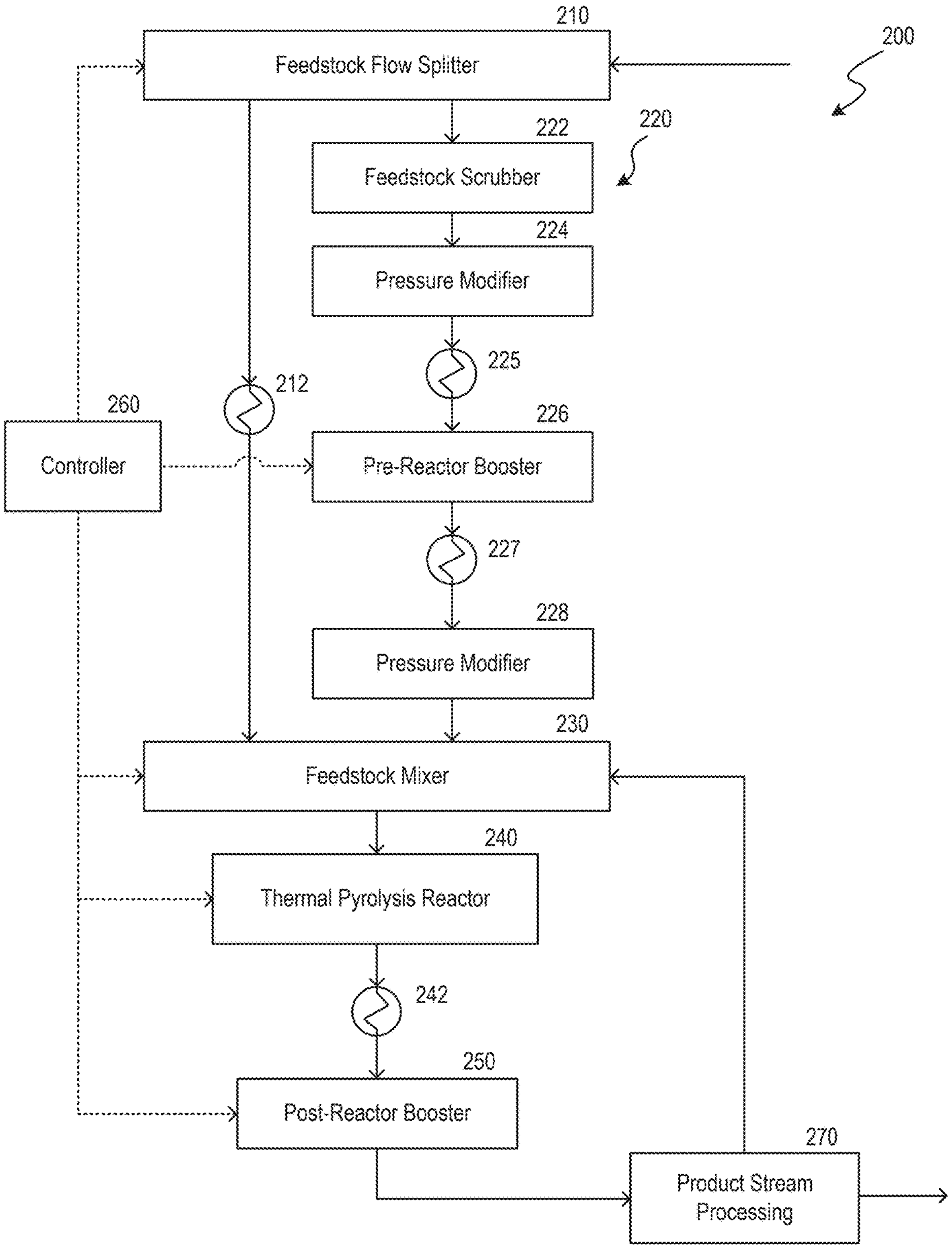
FIG. 2 is a schematic block diagram of a hybrid pyrolysis system configured in accordance with embodiments of the present technology.

Specific Examples of Kinetic Booster Components for Pyrolysis Systems in Accordance with Embodiments of the Present Technology FIG. 2 is a schematic block diagram of a hybrid pyrolysis system 200 configured in accordance with embodiments of the present technology. In the illustrated embodiments, the hybrid pyrolysis system 200 includes a feedstock flow splitter 210 that is fluidly couplable to a supply of a reactant feedstock (e.g., a natural gas pipeline). The feedstock flow splitter 210 can include one or more configurable valves that can divide an incoming supply of the reactant feedstock (sometimes also referred to herein as a "hydrocarbon reactant", a "hydrocarbon feedstock," "reaction fuel," and/or the like) into various input flow paths and/or control a volume of the reactant feedstock along each of the flow paths. In the illustrated embodiment, a first flow path from the feedstock flow splitter 210 goes into a booster component 220 and then into a feedstock mixer 230 and a thermal pyrolysis reactor 240 while a second flow path goes directly from the feedstock flow splitter 210 to the feedstock mixer 230 and the thermal pyrolysis reactor 240 through a first optional heat exchanger 212.

In the illustrated embodiment, the booster component 220 includes pre-reactor booster 226. In some embodiments, the pre-reactor booster 226 includes a plasma pyrolysis system (e.g., an electrically powered plasma pyrolysis reactor). The plasma pyrolysis system can inject energy into the portion of reactant feedstock in the first flow path upstream from the feedstock mixer 230 (and the thermal pyrolysis reactor 240). The injected energy helps reduce the amount of energy that the thermal pyrolysis reactor 240 must provide to reach the activation energy for the reactant feedstock. For example, the plasma pyrolysis system can include a cold plasma system where electron energy in the plasma is used to kickstart pyrolysis. More specifically, the cold plasma accelerates electrons that smash into hydrocarbon molecules, generating radicals like $CH_3$* and H*, $CH_2$ and 2H*, and so on. The radicals are then easier to decompose into hydrogen gas and solid carbon during later thermal pyrolysis than the original hydrocarbon (e.g., than $CH_4$). Additionally, or alternatively, the radicals are sometimes autocatalytic, allowing the radicals to help catalyze initial steps of pyrolysis reactions in a thermal pyrolysis system. In another example, the plasma pyrolysis system can include a thermal plasma system that injects thermal energy into the portion of reactant feedstock in the first flow path. In turn, the injected energy can effectively pre-heat the incoming reactant feedstock, can split the reactant feedstock into a radical species, and/or can partially (or fully) convert the portion of reactant feedstock in the first flow path to hydrogen gas and solid carbon.

In some embodiments, the pre-reactor booster 226 includes a catalytic system. For example, the pre-reactor booster 226 can include expose the first flow path to various non-oxidative catalysts. In some embodiments, the pre-reactor booster 226 includes ceramic scaffolds (e.g., a catalytic converter, a wire mesh, a wire wool, and/or any other suitable structure) that are coated with various catalysts to reduce the activation energy of the reactant feedstock by dehydrogenating and/or activating a portion (e.g., between about 0.1% to about 1%, between about 1% and about 10%, or greater than about 10%) of the reactant feedstock in the first flow path. That is, interactions with the non-oxidative boosters can desorb some H and/or $H_2$ from the reactant feedstock, thereby reducing the activation energy needed for thermal pyrolysis. Examples of non-oxidative boosters coating the ceramic structures include tungsten (W), Molybdenum (Mo), Platinum (Pt), Ruthenium (Ru), Rhodium (Rh), Iridium (Ir), Iron (Fe), Nickel (Ni), Copper (Cu), Manganese (Mn), Zinc (Zn), and/or Bismuth (Bi). In some embodiments, the non-oxidative boosters (and/or the ceramic structures) are heated to a temperature between about 300° C. and about 700° C. to further help reduce the activation energy of the reactant feedstock by further dehydrogenating and/or activating a portion of the reactant feedstock. In such embodiments, the temperature of the non-oxidative catalyst is limited to help avoid formation of solid carbon, which would threaten to foul the pre-reactor booster 226. In some of the non-oxidative embodiments, the pre-reactor booster 226 can expose the first flow path to various solid particulates, thereby providing nucleation sites for the carbon during later thermal pyrolysis reactions.

In some embodiments, the pre-reactor booster 226 provides various doping agents to the reactant feedstock in the first flow path. For example, the pre-reactor booster 226 can dope the reactant feedstock with carbon particulates, a polyaromatic species, and/or various oxidative catalysts. As discussed above, the carbon particulates can provide nucleation sites for pyrolysis, while the polyaromatic species and/or the oxidative elements can help jumpstart the pyrolysis reaction and/or absorb byproducts. As further discussed above, one bonus of the oxidative catalysts is that they can help remove carbon deposits from a reaction chamber during thermal pyrolysis via carbon monoxide and/or carbon dioxide.

The feedstock mixer 230 receives and mix the portions of reactant feedstock in the first flow path and the second flow path. The resulting mixture is a reactant feedstock input (e.g., a modified input) that has a lower activation energy compared to the reactant feedstock flowing into the feedstock flow splitter 210. The feedstock mixer 230 then provides the modified input to the thermal pyrolysis reactor 240. Similar to the discussion above, the thermal pyrolysis reactor 240 can include a reaction chamber that is thermally coupled to a combustion component (e.g., surrounding a combustion chamber and/or fluidly coupled to the combustion component to receive flue gas from the combustion component). The reaction chamber can help transfer heat from a combustion at the combustion component (e.g., of natural gas, of hydrogen gas, and/or the like) into the modified input to drive thermal pyrolysis within the reaction chamber. However, because the modified input has a lower activation energy, the thermal pyrolysis reactor 240 can convert a higher portion of the modified input into hydrogen gas and solid carbon and/or can consume less energy to convert the modified input. For example, as discussed above, radicals (e.g., $CH_3$* and H*, $CH_2$ and 2H*, and/or the like) produced in the pre-reactor booster 226 can require less heat to further decompose and/or can help catalyze pyrolysis for unreacted hydrocarbon molecules. In another example, as also discussed above, solid carbon from the pre-reactor booster 226 can provide fluidized nucleation sites for new carbon, thereby lowing the activation energy for new pyrolysis and helping reduce fouling within the thermal pyrolysis reactor 240.

As a result of the processes discussed above, the thermal pyrolysis reactor 240 generates an output flow from the modified input that includes hydrogen gas and solid carbon. In various embodiments, the output flow can also include unreacted hydrocarbons and/or various byproducts (e.g., organic compounds, intermediate species, flue gas from combustions, and/or the like). As further illustrated in FIG. 2, the thermal pyrolysis reactor 240 can then direct the output flow through a second optional heat exchanger 242 (e.g., a recuperator) and/or a post-reactor booster 250.

The post-reactor booster 250 can be generally similar to the pre-reactor booster discussed above to inject additional energy into the output flow. The additional energy can help complete the pyrolysis reaction for a lingering intermediate species (e.g., any of the radicals discussed above) and/or unreacted hydrocarbons, and/or can help break down byproducts from the pyrolysis reaction. The post-reactor booster 250 can then direct the resulting flow to a product stream processing component 270.

Similar to the product stream processing component 130 discussed above with reference to FIG. 1, the product stream processing component 270 can include various product separators, compressors, gas processors, and/or the like to separate products in the output flow from each other and/or condition the separated products for downstream uses. For example, the product stream processing component 270 can include one or more carbon separation components (e.g., a cyclone separator, one or more filters (e.g., a mesh filter, a baghouse filter, and/or the like), a gas-liquid separator, and/or any other suitable separator) to remove carbon (and other particulates) from the gasses in the output flow.

As further illustrated in FIG. 2, the product stream processing component 270 can then direct a portion of the separated carbon particulates (sometimes referred to herein as "recycled carbon") back to the feedstock mixer to be combined with the incoming hydrocarbon reactant. Similar to the discussion of pre-reactor carbon above, the recycled carbon can then provide fluidized nucleation sites to the reactant feedstock. As a result, the recycled carbon can help reduce an activation energy of the pyrolysis reaction within the thermal pyrolysis reactor 240 and/or can help increase an efficiency of the thermal pyrolysis reactor 240 (e.g., by reducing fouling). In various such embodiments, the product stream processing component 270 can select carbon to recycle based on a size, density, and/or surface area of the carbon to select carbon particles that increase (or maximize) surface area while being small enough to be fluidized through the thermal pyrolysis reactor 240.

Additionally, or alternatively, the product stream processing component 270 can help process and/or filter gasses in the output flow. For example, the product stream processing component 270 can filter the gas to remove various byproducts from the output flow (e.g., via one or more organic compound separation components, one or more gas separators, and/or the like) and/or condition the output flow to separate the hydrogen gas (and/or unreacted hydrocarbons) from other gasses in the output flow. The product stream processing component 270 can then direct the resulting hydrogen gas (pure hydrogen gas or mixed with various remaining gasses, such as unreacted natural gas) to various endpoints. Purely by way of example, product stream processing component 270 can direct a portion of the hydrogen gas to a combustion component for the thermal pyrolysis reactor 240 to help drive thermal pyrolysis. In another example, the product stream processing component 270 can direct a portion of the hydrogen gas to various other endpoints.

As further illustrated in FIG. 2, the hybrid pyrolysis system 200 can include a controller 260. The controller 260 can be operably coupled to the feedstock flow splitter 210, the pre-reactor booster 226 (and/or the booster component 220 more generally), the feedstock mixer 230, the thermal pyrolysis reactor 240, the post-reactor booster 250, and/or various other suitable components to control various operating parameters within the hybrid pyrolysis system 200. More specifically, the controller 260 can control the operating parameters to help meet a target hydrogen output, a target carbon output, a target conversion rate, a target efficiency, energy consumption goals, limits on available energy, and/or the like. For example, the controller 260 can control the feedstock flow splitter 210 to control the volume of reactant feedstock in the first flow path, the volume of reactant feedstock in the second flow path, and/or a ratio between the first and second flow paths. In some such embodiments, the ratio between the first and second flow paths is based on a conversion efficiency of the booster component 220. For example, when the booster component 220 has a relatively high conversion rate (e.g., splitting more than about 34% of hydrocarbons into solid carbon, hydrogen gas, and/or pre-pyrolysis radicals), the controller 260 can cause the feedstock flow splitter 210 to divert about 1%, about 5%, about 10%, or up to about 33% of the incoming reactant feedstock flow into the first flow path. The limitation on the hydrocarbons directed to the booster component 220 can help reduce energy requirements for the booster component 220 and/or can help reduce fouling in the booster component 220. In another example, when the booster component 220 has a relatively low conversion rate (e.g., splitting about 1%, about 5%, about 10%, or up to about 33% of hydrocarbons), the controller 260 can cause the feedstock flow splitter 210 to divert a larger percentage of the reactant feedstock (including 100%) into the first flow path.

In another example, the controller 260 can control input parameters to the booster component 220 (e.g., power, pulse rate, etc.) and/or the feedstock flow splitter 210 to tune properties (e.g., particle size, surface area, particle density, and/or the like) of carbon resulting from the booster component 220. In a specific, non-limiting example, the input control parameters can maximize the surface area of the carbon to provide maximum nucleation sites for thermal pyrolysis. In another specific, non-limiting example, the controller 260 can control the input parameters to generate carbon with similar properties as the carbon produced by thermal pyrolysis. The similarities can help improve a homogeneity of the solid carbon co-product resulting from the hybrid pyrolysis system 200.

Another important factor in the ratio between the first flow path and the second flow path is the total energy required by the hybrid pyrolysis system 200 to produce a target amount of hydrogen gas and/or solid carbon. For example, the amount of energy required by the booster component 220 is typically proportional to the total amount of reactant feedstock converted but the absolute conversion percentage for a given energy input is typically a property of the booster type selected (e.g., cold plasma vs. thermal plasma). In some embodiments, the controller 260 operates the hybrid pyrolysis system 200 to minimize the total energy requirements to reach a target production output. In some embodiments, the controller 260 operates the hybrid pyrolysis system 200 to minimize the total energy requirements to reach a target conversion percentage. In some embodiments, the controller 260 operates the hybrid pyrolysis system 200 to maximize the total conversion percentage and/or the total output (e.g., without regard to energy consumption requirements).

As further illustrated in FIG. 2, the hybrid pyrolysis system 200 can include a variety of other components to help support the conversion of reactant feedstock into solid carbon and hydrogen gas. For example, the second flow path (e.g., the flow path directly between the feedstock flow splitter 210 and the feedstock mixer 230) can include the first optional heat exchanger 212. The first optional heat exchanger 212 can help preheat incoming reactant feedstock, for example using heat recovered from the output flow by the second optional heat exchanger 242. In some embodiments, the first optional heat exchanger 212 and the second optional heat exchanger 242 are integrated into a single unit (e.g., a recuperator transferring heat from the output flow to the second input flow). Additionally, or alternatively, the first optional heat exchanger 212 can be thermally coupled to various other sources of heat, such as an output from the combustion component of the thermal pyrolysis reactor 240, a thermal-electrical electrical heating component, and/or the like.

Additionally, or alternatively, as further illustrated in FIG. 2, the booster component 220 can include one or more optional flow-moderating components to support the operation of the pre-reactor booster 226. For example, in the illustrated embodiments, the booster component 220 further includes a feedstock scrubber 222 fluidly coupled to the feedstock flow splitter 210, a first pressure modifier 224 fluidly coupled to the feedstock scrubber 222, a third optional heat exchanger 225 coupled between the first pressure modifier 224 and the pre-reactor booster 226, a fourth optional heat exchanger 227 fluidly coupled to the pre-reactor booster 226, and a second pressure modifier 228 fluidly coupled to the third optional heat exchanger 225.

The feedstock scrubber 222 can help purify incoming reactant feedstock to remove solid particulates and/or non-hydrocarbon gasses. The purification can help reduce byproducts in the output flow and/or increase an efficiency of the thermal pyrolysis.

The first pressure modifier 224 can increase (or decrease) the pressure of the incoming hydrocarbon reactant to an optimal pressure for the pre-reactor booster 226. The second pressure modifier 228 can then decrease (or increase) the pressure to match the initial pressure and/or a target pressure for the feedstock mixer 230 and/or the thermal pyrolysis reactor 240. In some embodiments, the booster component 220 includes only one of the first and second pressure modifiers 224, 228. For example, the operating pressure of operation in the thermal pyrolysis reactor 240 can be higher than the operating pressure of the pre-reactor booster 226. In such embodiments, the booster component 220 can include only the second pressure modifier 228 to increase a pressure in the first flow path downstream from the pre-reactor booster 226. In a specific, non-limiting example, the second pressure modifier 228 can include a venturi to increase a pressure of gas and fluidized solids within the first flow path downstream from the pre-reactor booster 226.

The third and fourth optional heat exchangers 225, 227 can help control a temperature of the reactant feedstock in the first flow path. For example, the third and fourth optional heat exchangers 225, 227 can pre-heat and/or recover heat from the reactant feedstock in the first flow path. In various specific, non-limiting examples, the third and fourth optional heat exchangers 225, 227 can help recuperate heat from the thermal pyrolysis reactor 240, and/or can include a thermal-electrical heating component, can include one or more cooling components. Additionally, or alternatively, the third and fourth optional heat exchangers 225, 227 can help control a pressure of the reactant feedstock.

Although the hybrid pyrolysis system 200 is discussed and illustrated as including each of the components discussed above, the hybrid pyrolysis system 200 of FIG. 2 is not so limited. For example, various components of the hybrid pyrolysis system 200 of FIG. 2 can be omitted while maintaining a hybrid pyrolysis system. In a specific, non-limiting example, recycled carbon can act as the sole modification to the reactant feedstock from a kinetic booster for the hybrid pyrolysis system 200. In this example, the hybrid pyrolysis system 200 can omit the feedstock flow splitter 210 and/or the booster component 220 and rely on the feedstock mixer 230 to mix fluidized recycled carbon with incoming reactant feedstock. The recycled-carbon-only embodiments of the hybrid pyrolysis system 200 can be useful, for example, to help simplify the maintenance and/or reduce the footprint of the hybrid pyrolysis system 200. In another specific, non-limiting example, the hybrid pyrolysis system 200 can rely only on the booster component 220 to provide modifications to the reactant feedstock for thermal pyrolysis and can therefore omit the flow path for recycled carbon. In a related specific, non-limiting example, the hybrid pyrolysis system 200 can toggle back and forth between kinetic booster modes (e.g., recycled carbon-only, pre-reactor plasma systems only, and/or the like), and therefore includes each of the components discussed above. In yet another specific, non-limiting example, the hybrid pyrolysis system 200 can omit one or more of the optional heat exchangers and/or various features of the booster component 220 illustrated in FIG. 2. In yet another specific, non-limiting example, the hybrid pyrolysis system 200 can omit (or rely only on) the post-reactor booster 250. Additional specific examples are discussed below with reference to FIGS. 3 and 4. Accordingly, one of skill in the art will recognize that various components of the hybrid pyrolysis system 200 can be omitted while remaining within these and other embodiments of the present technology.

Further, while the hybrid pyrolysis system 200 is discussed and illustrated as including a 1:1 ratio between components thereof, one of skill in the art will understand that the hybrid pyrolysis system 200 of FIG. 2 is not so limited. For example, the hybrid pyrolysis system 200 can include multiple pre-reactor boosters 226, multiple booster components 220, multiple reaction chambers within the thermal pyrolysis reactor 240, multiple thermal pyrolysis reactors 240, multiple post-reactor boosters 250, and/or any combination thereof. In a specific, non-limiting example, a single pre-reactor booster 226 can be fluidly coupled to two or more reaction chambers within the thermal pyrolysis reactor 240.

Still further, it will be understood that one or more of the components of the hybrid pyrolysis system 200 discussed with reference to FIG. 2 can be combined and/or split into further sub-components. Purely by way of example, the feedstock mixer 230 can be an integral part of the thermal pyrolysis reactor that is fluidly coupled to each reaction chamber therein.

Figure 3:
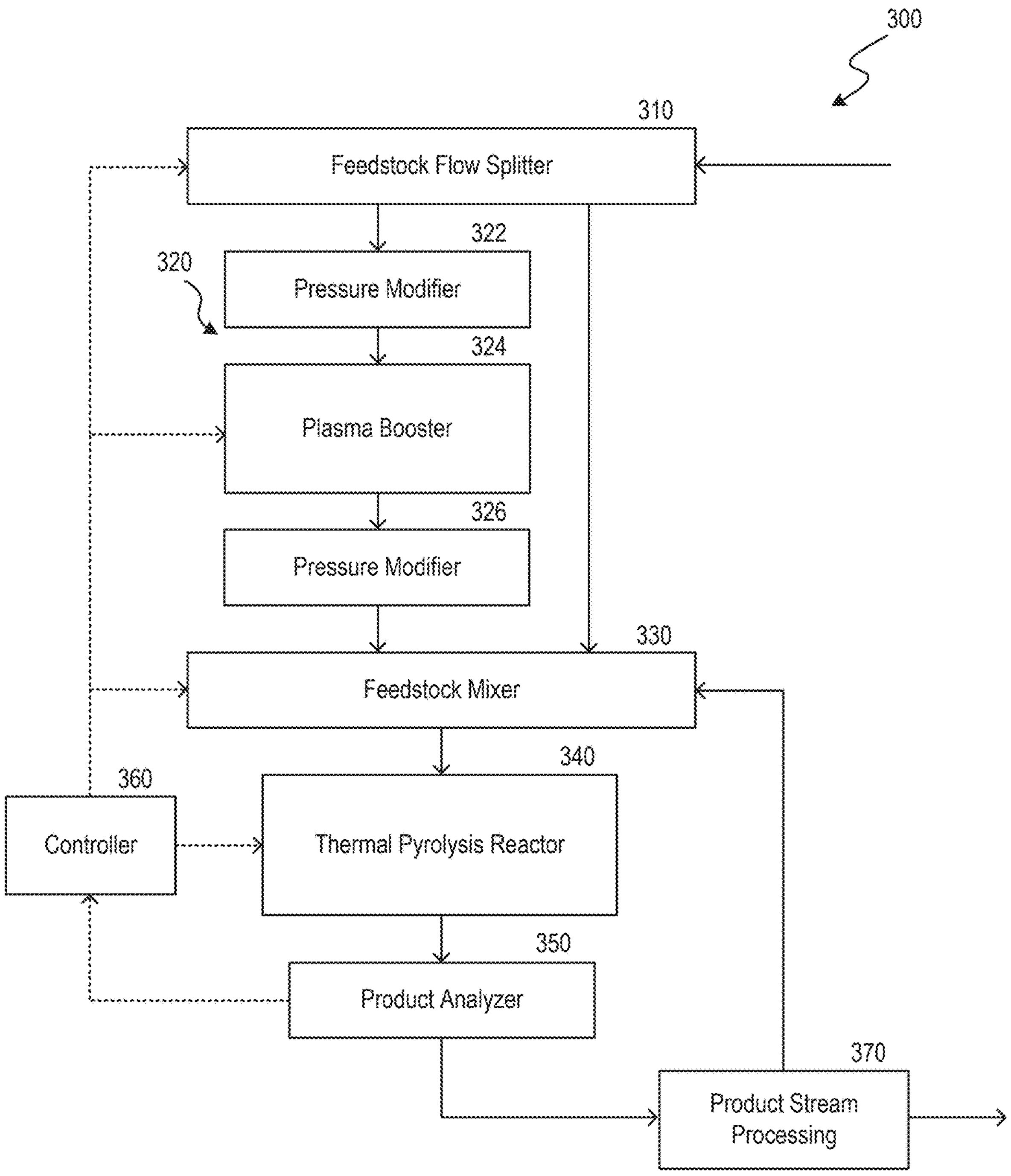
FIG. 3 is a schematic block diagram of a hybrid pyrolysis system configured in accordance with further embodiments of the present technology.

FIG. 3 is a schematic block diagram of a hybrid pyrolysis system 300 configured in accordance with further embodiments of the present technology. As illustrated in FIG. 3, the hybrid pyrolysis system 300 is generally similar to the hybrid pyrolysis system 200 of FIG. 2. For example, the hybrid pyrolysis system 300 of FIG. 3 includes a feedstock flow splitter 310 that is fluidly couplable to a supply of a reactant feedstock (e.g., a natural gas pipeline). The feedstock flow splitter 310 can controllably divide an incoming supply of the reactant feedstock into various input flow paths and/or control a volume of the reactant feedstock along each of the flow paths. In the illustrated embodiment, a first flow path from the feedstock flow splitter 310 goes into a booster component 320 and then into a feedstock mixer 330 while a second flow path goes directly from the feedstock flow splitter 310 to the feedstock mixer 330.

The booster component 320 illustrated in FIG. 3 includes a first pressure modifier 322, a plasma booster 324 (e.g., a cold plasma booster and/or a thermal plasma booster) fluidly coupled to the first pressure modifier 322, and a second pressure modifier 326 fluidly coupled to the plasma booster 324. Similar to the discussion above, the plasma booster 324 can inject energy into the reactant feedstock to reduce an activation energy for the reactant feedstock during later thermal pyrolysis. The energy can be injected by creating radicals in the reactant feedstock, pre-heating the reactant feedstock, and/or partially (or fully) reacting the reactant feedstock in the first flow path. The reaction can generate solid carbon to provide nucleation sites top help kickstart later thermal pyrolysis. In some embodiments, various operating parameters of the booster component 320 are controllable to control various properties (e.g., specific surface area, density, particle size, and/or the like) of the resulting carbon particles.

The feedstock mixer 330 receives and mixes the reactant feedstock from the first and second flow paths. The feedstock mixer 330 then provides the mixed reactant feedstock to a thermal pyrolysis reactor 340. Similar to the discussion above, the thermal pyrolysis reactor 340 can include a reaction chamber that is thermally coupled to a combustion component. The reaction chamber can help transfer heat from a combustion at the combustion component (e.g., of natural gas, of hydrogen gas, and/or the like) into the mixed input to drive thermal pyrolysis within the reaction chamber. However, because the mixed input has a lower activation energy, the thermal pyrolysis reactor 340 can convert a higher portion of the modified input into hydrogen gas and solid carbon and/or can consume less energy to convert the mixed input.

The thermal pyrolysis reactor 340 can then emit an output flow that includes solid carbon and hydrogen gas toward a product analyzer 350. The product analyzer 350 can monitor various aspects of the output flow, such as carbon content, hydrogen content, hydrocarbon content, a ratio between hydrogen and unreacted hydrocarbons, an output purity of the hydrogen, characteristics (e.g., particle size, purity, density, and/or the like) of the carbon, byproduct content, temperature, pressure, and/or the like. The product analyzer 350 can then communicate information to a controller 360.

The controller 360 is operably coupled to the feedstock flow splitter 310, the plasma booster 324 of the booster component 320, the feedstock mixer 330, and/or the thermal pyrolysis reactor 340. Accordingly, the controller 360 can control various operating parameters of the components of the hybrid pyrolysis system 300 in response to the measurements from the product analyzer 350. For example, similar to the discussion above, the controller 360 can operate the feedstock flow splitter 310 to modify a ratio between the first flow path and the second flow path, thereby modifying how much incoming reactant feedstock is directed through a kinetic booster upstream from the thermal pyrolysis reactor 340. In another example, the controller 360 can modify various operating parameters of the plasma booster 324 (e.g., a current delivered to the plasma booster, voltage delivered to the plasma booster, pulse width, pulse rate, temperature of the plasma booster, and/or the like), each of which can affect the energy delivered to the reactant feedstock in the first flow path. That is, the controller 360 can modify various operating parameters of the plasma booster 324 to modify how much of a boost the plasma booster 324 provides upstream from the thermal pyrolysis reactor 340. In another example, the controller 360 can modify various operating parameters of the thermal pyrolysis reactor 340, such as an operating temperature of the thermal pyrolysis reactor 340, a consumption feedstock consumption rate, and/or the like. As also discussed above, the modifications to the operating parameters of the hybrid pyrolysis system 300 can be based on various targets for the output flow. For example, the modifications can be based on a target rate of hydrogen and/or carbon production, a target output purity for the hydrogen, target characteristics for the carbon, an overall target for hydrogen and/or carbon production, a target energy consumption, a target for energy efficiency, and/or the like. In a specific, non-limiting example, the modifications can help ensure that the hydrogen gas is at least about 75% of the output flow.

The product analyzer 350 can then direct the output flow toward a product stream processing component 370. Similar to the product stream processing component 270 of FIG. 2, the product stream processing component 370 can include various product separators, compressors, gas processors, and/or the like to separate products in the output flow from each other and/or condition the separated products for downstream uses. For example, the product stream processing component 370 can include one or more carbon separation components (e.g., a cyclone separator, one or more filters (e.g., a mesh filter, a baghouse filter, and/or the like), a gas-liquid separator, and/or any other suitable separator) to remove carbon (and other particulates) from the gasses in the output flow. Further, the product stream processing component 370 can then direct a portion of the separated carbon particulates (sometimes referred to herein as "recycled carbon") back to the feedstock mixer to be combined with the incoming hydrocarbon reactant. Similar to the discussion above, the recycled carbon can then provide fluidized nucleation sites to the reactant feedstock. In various such embodiments, the product stream processing component 370 can select carbon to recycle based on a size, density, and/or surface area of the carbon. Additionally, or alternatively, the product stream processing component 370 can help process and/or filter gasses in the output flow. The product stream processing component 370 can then direct the resulting hydrogen gas (pure hydrogen gas or mixed with various remaining gasses, such as unreacted natural gas) to various endpoints.

Figure 4:
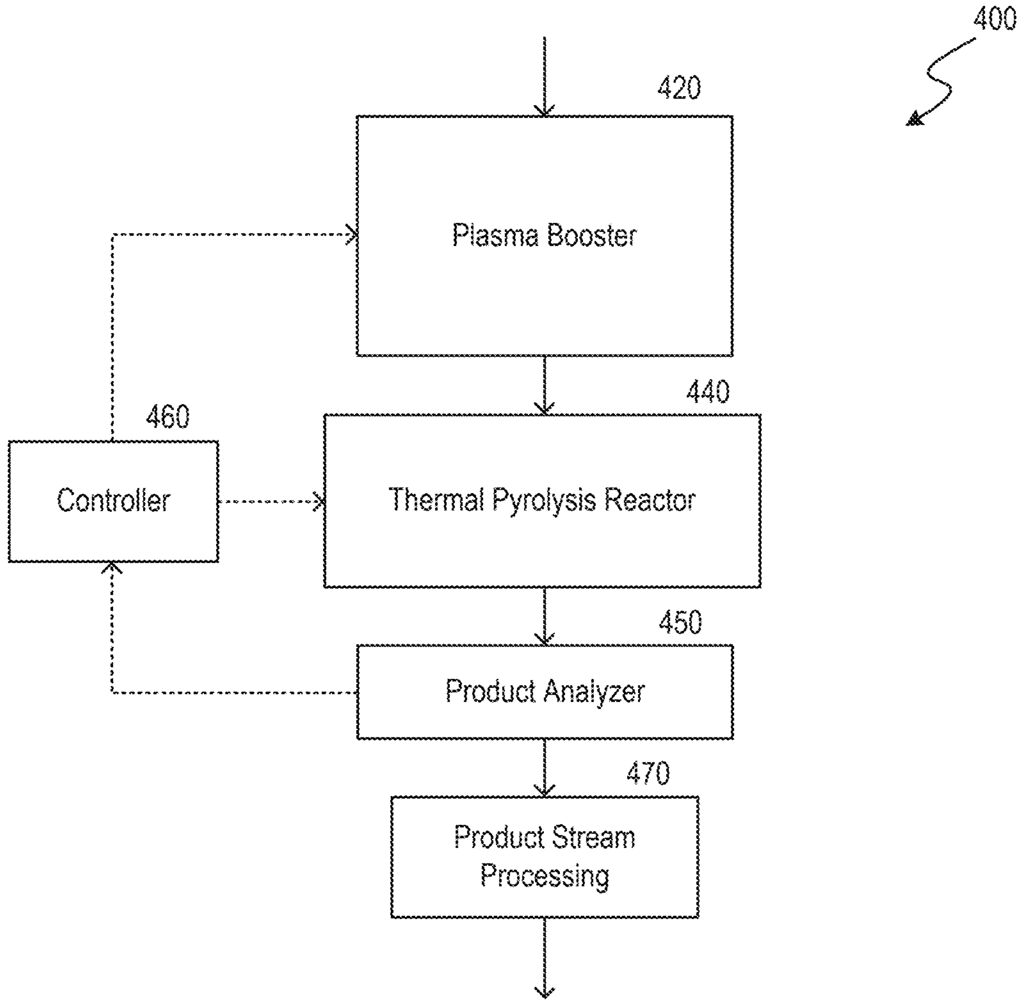
FIG. 4 is a schematic block diagram of a hybrid pyrolysis system configured in accordance with various specific embodiments of the present technology.

FIG. 4 is a schematic block diagram of a hybrid pyrolysis system 400 configured in accordance with various specific embodiments of the present technology. As illustrated in FIG. 4, the hybrid pyrolysis system 400 is generally similar to the hybrid pyrolysis systems 200, 300 of FIGS. 2 and 3, respectively. For example, the hybrid pyrolysis system 400 of FIG. 4 includes a plasma booster 420 configured to receive a hydrocarbon reactant from a supply of the hydrocarbon reactant, a thermal pyrolysis reactor 440 fluidly coupled to the plasma booster 420, a product analyzer 450 fluidly coupled to the thermal pyrolysis reactor 440, product stream processing component 470 fluidly coupled to the product analyzer 450, as well as a controller operably coupled to the plasma booster 420, the thermal pyrolysis reactor 440, and the product analyzer 450. In the illustrated embodiment, however, the hybrid pyrolysis system 400 includes a single flow path for the incoming reactant feedstock and does not recycle carbon from the output flow. As a result, the hybrid pyrolysis system 400 can omit the feedstock flow splitters and feedstock mixers discussed above.

The single-path embodiments illustrated in FIG. 4 can help reduce a footprint of the overall hybrid pyrolysis system 400 and/or can help simplify the operation of the hybrid pyrolysis system 400. For example, the controller 460 can focus on modifications to the operating parameters of the plasma booster 420 and/or the thermal pyrolysis reactor 440 to adjust the output from the hybrid pyrolysis system 400. Further, because the adjustments impact a single incoming flow path, the adjustments to the operating parameters can more quickly and/or more directly impact the output from the hybrid pyrolysis system 400.

Figure 5:
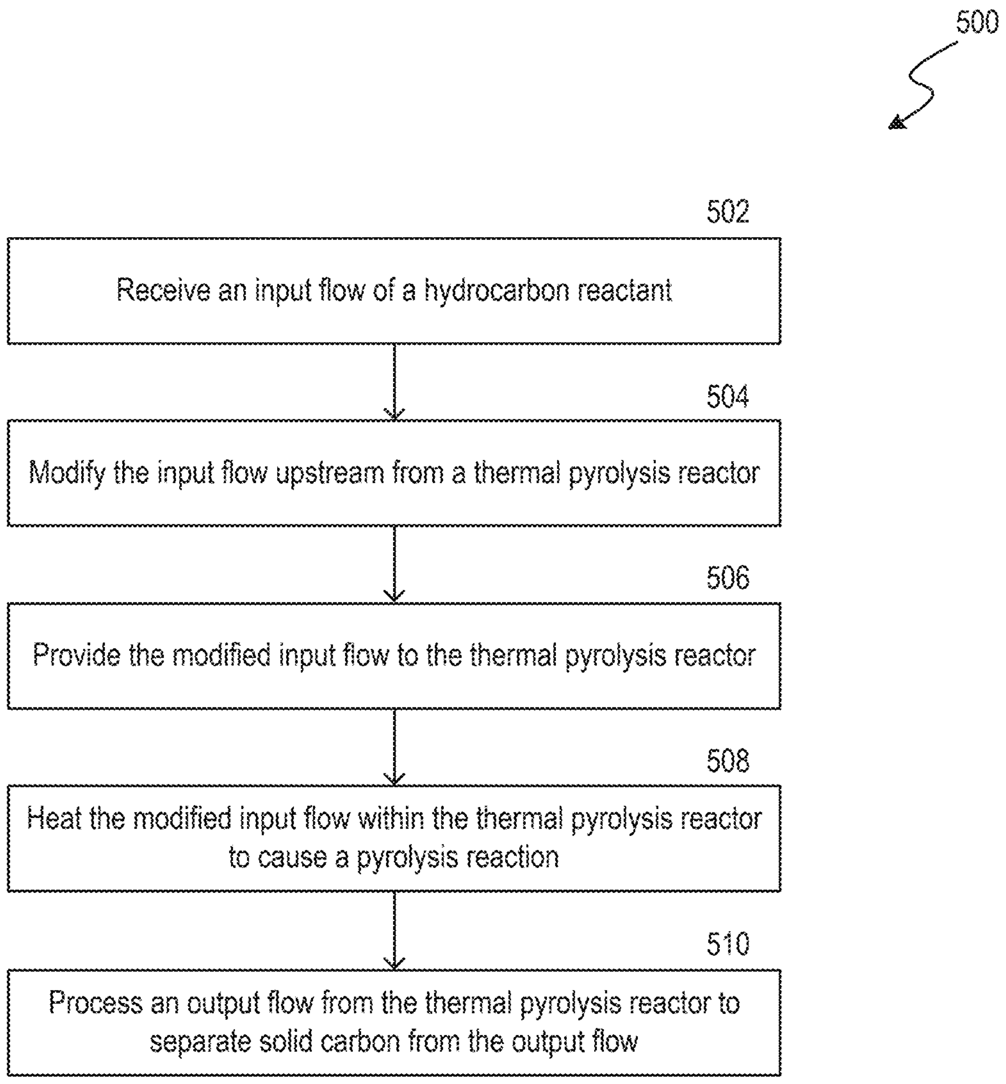
FIG. 5 is a flow diagram of a process for operating a pyrolysis system configured in accordance with embodiments of the present technology.

FIG. 5 is a flow diagram of a process 500 for operating a pyrolysis system in accordance with embodiments of the present technology. The process 500 of FIG. 5 can be executed by any of the controllers discussed above in conjunction with various components of the pyrolysis system (e.g., any of the components discussed above with respect to FIGS. 1-4). Additionally, or alternatively, although discussed herein in the context of being executed entirely by a single component (e.g., entirely by a single controller), it will be understood that one or more steps in the process 500 can be executed by a different computing device than one or more other steps.

The process 500 begins at block 502 by receiving an input flow of a hydrocarbon reactant. As discussed above, the hydrocarbon reactant (sometimes also referred to herein as a "reactant feedstock," a "hydrocarbon feedstock," "reaction fuel," and/or the like) can include natural gas, pure methane, ethane biogas, propane, and/or another suitable hydrocarbon. The input flow can be received from any suitable source of the hydrocarbon reactant, such as a natural gas pipeline, a storage container, and/or the like. Further, the hydrocarbon reactant can be received by a variety of suitable components of a pyrolysis system, such as at a feedstock flow splitter, a booster component, a feedstock mixing component, and/or the like.

At block 504, the process 500 includes modifying the input flow to provide a kinetic boost to the hydrocarbon reactant upstream from a thermal pyrolysis reactor in the pyrolysis system. As discussed above, the modification can include a variety of changes to the input flow. For example, the modification can include adding thermal energy to the hydrocarbon reactant (e.g., pre-heating the reactant), forming one or more intermediate species (e.g., $CH_3$*, H*, and/or the like), directing the input flow through one or more catalysts (e.g., a ceramic mesh coated with a non-oxidative catalyst), doping the input with carbon particulates, doping the input with an oxidative catalyst (e.g., water, steam, air, and/or methanol), doping the input with a reactive hydrocarbon species (e.g., $C_2$, $C_3$, $C_{3+}$, polyaromatics, and/or the like), partially and/or fully reacting a portion of the incoming flow (e.g., conducting a pyrolysis reaction for a portion of the input within a plasma component), and/or the like. In each example, the modification reduces the activation energy that the thermal pyrolysis reactor must provide to reach a target pyrolysis rate within the pyrolysis system (e.g., total hydrogen output, percentage conversion, hydrogen purity in an output from the pyrolysis system, and/or the like). Additionally, or alternatively, the modifications from the kinetic boosters can help reduce carbon build-up in the thermal pyrolysis reactor by increasing the amount of carbon carried by fluidized particles and/or softening hard carbon build-ups in the thermal pyrolysis reactor. In some embodiments, the modification includes splitting the input flow into two or more channels, running one or more of the channels through a booster component, then re-mixing the split flows. In some embodiments, the modification includes running all of the input flow through a booster component. In some embodiments, the modification includes mixing one or more doping agents (e.g., carbon, polyaromatics, oxidative catalysts, and/or the like) with the input flow in a mixing component.

At block 506, the process 500 includes providing the modified input flow to the thermal pyrolysis reactor. The thermal pyrolysis reactor can include one or more reaction chambers to receive the modified input flow. In multi-chamber embodiments, the process 500 at block 506 can include splitting the modified input flow into multiple flows each corresponding to one of the chambers. Then, at block 508, the process 500 includes heating the modified input flow to cause a pyrolysis reaction. For example, as discussed above, one or more combustion components can provide heat to each of the one or more reaction chambers in the thermal pyrolysis reactor. The reaction chamber(s) can then transfer heat from the combustion into the hydrocarbon reactant in the modified input flow, thereby causing a pyrolysis reaction. As discussed above, the pyrolysis reaction breaks the hydrocarbon down into hydrogen gas and solid carbon (and/or various byproducts) in an output flow for the thermal pyrolysis reactor.

At block 510, the process 500 includes processing the output flow from the thermal pyrolysis reactor to separate the solid carbon from the output flow (e.g., thereby separating the solid carbon and hydrogen gas coproducts). Once separated, the solid carbon and hydrogen gas can be directed to various suitable endpoints, such as further processing units (e.g., gas scrubbers), chemical processing units, collection chambers, combustion components, and/or the like.

A person of ordinary skill in the relevant art will recognize that the illustrated process 500 can be altered and still remain within these and other embodiments of the present technology. For example, the process 500 can be modified in view of any of the process discussed below with reference to FIG. 6 to incorporate analyzing the output flow and/or adjusting operating parameters for the pyrolysis system based on results of the analysis. In another example, the process 500 can be modified to include a kinetic booster stage after heating the modified input at block 508 (e.g., adding a post-reactor booster component) to help complete pyrolysis reactions in the hydrocarbon reactant.

Figure 6:
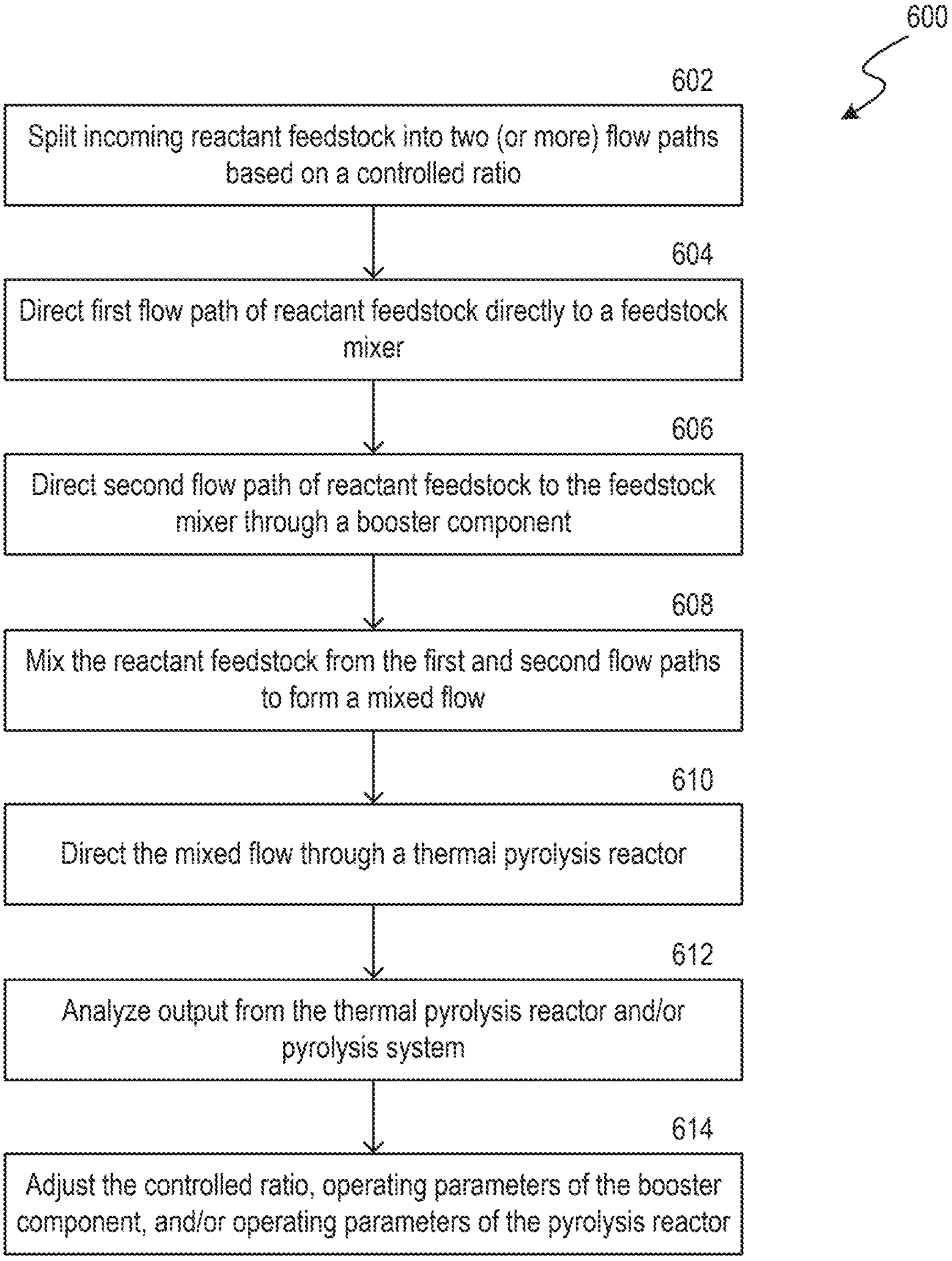
FIG. 6 is a flow diagram of a process for operating a pyrolysis system configured in accordance with various specific embodiments of the present technology.

FIG. 6 is a flow diagram of a process 600 for dynamically operating a pyrolysis system in accordance with various specific embodiments of the present technology. Similar to the process 500 discussed above with reference to FIG. 5, the process 600 of FIG. 6 can be executed by any of the controllers discussed above in conjunction with various components of the pyrolysis system (e.g., any of the components discussed above with respect to FIGS. 1-4). Additionally, or alternatively, although discussed herein in the context of being executed entirely by a single component (e.g., entirely by a single controller), it will be understood that one or more steps in the process 600 can be executed by a different computing device than one or more other steps.

The process 600 begins at block 602 by splitting an incoming reactant feedstock into two (or more) flow paths (e.g., streams) based on a controlled ratio. The split in block 602 can be implemented by a feedstock splitting component using one or more controllable valves, flow meters, and/or any other suitable component.

At block 604, the process 600 includes directing a first flow path of the reactant feedstock directly to a feedstock mixer. For example, the process 600 can include directing the first flow path from the feedstock flow splitter 210 of FIG. 2 directly to the feedstock mixer 230 (with or without the first optional heat exchanger 212). Conversely, at block 606, the process 600 includes directing the second flow path of the reactant feedstock to the feedstock mixer through a booster component (e.g., the booster component 220 of FIG. 2). As discussed above, the booster component can modify the hydrocarbon reactant in the second flow path by heating the hydrocarbon reactant, partially or fully reacting the hydrocarbon reactant, doping the hydrocarbon reactant with various catalysts, flowing the hydrocarbon reactant through various catalytic components, and/or the like. As a result, the hydrocarbon reactant in the second flow path can have a lower activation energy for pyrolysis than the hydrocarbon reactant in the first flow path.

Once each of the flow paths arrive at the feedstock mixer, at block 608, the process 600 includes mixing the hydrocarbon reactant from the first and second flow paths. The resulting mixed flow (sometimes also referred to as a "modified input flow") can have a lower activation energy than the hydrocarbon reactant received at block 602 and/or is otherwise modified to help improve the operation of a thermal pyrolysis reactor.

At block 610, the process 600 includes directing the mixed flow through the thermal pyrolysis reactor. Similar to the discussion above, the thermal pyrolysis reactor can include one or more reaction chambers to receive the mixed flow. In multi-chamber embodiments, the process 600 at block 610 can include splitting the mixed flow into multiple flows each corresponding to one of the chambers. The thermal pyrolysis reactor then heats the mixed flow to cause a pyrolysis reaction. As further discussed above, the pyrolysis reaction breaks the hydrocarbon reactant down into hydrogen gas and solid carbon (and/or various byproducts) in an output flow for the thermal pyrolysis reactor.

At block 612, the process 600 includes analyzing the output from the thermal pyrolysis reactor and/or a post-processing output from the pyrolysis system (e.g., after separating solid carbon from hydrogen gas). The analysis can include measuring a total volume of hydrogen in the output, a total volume of carbon in the output, a ratio of hydrogen to other gasses in a the output, a ratio of hydrogen to unreacted hydrocarbon reactant in the output, various parameters of the solid carbon (e.g., size, density, surface area, and/or the like; a purity of the resulting carbon; an oil content of the resulting carbon; and/or the like), and/or any other suitable parameter. In a specific, non-limiting example, the process 600 at block 612 can include checking whether hydrogen gas represents at least about 75% of the gasses in the output (e.g., by volume, by weight, by molecular ratio, and/or the like). In another specific, non-limiting example, the process 600 at block 612 can include checking a conversion rate for the hydrocarbon reactant into hydrogen gas for a preset thermal energy input (e.g., checking a kilowatt-hour_therm per kilogram of $H_2$ (kWH_therm/kg of $H_2$) that is produced). In some such embodiments, the process 600 at block 612 checks the resulting measurement against a baseline (e.g., the kWH_therm/kg of $H_2$ for a non-boosted reactor) to ensure that the kWH_therm/kg of $H_2$ is reduced by a factor of 1, 2, 5, 10, and/or 25 compared to the baseline.

At block 614, the process 600 includes adjusting one or more parameters of the pyrolysis system based on the analysis from block 612. The parameters can include the controlled ratio discussed above with reference to block 604 (e.g., the ratio of the hydrocarbon reactant directed into the first flow path vs the second flow path). Additionally, or alternatively, the parameters can include various operating parameters of the booster component, such as a current, voltage, pulse width, pulse frequency, and/or the like delivered to a plasma booster; an operating temperature of the booster component; an operating pressure of the booster component; a residence time in the booster component; an amount of doping catalysts added to the hydrocarbon reactant; and/or the like. Additionally, or alternatively, the parameters can include various operating parameters of the thermal pyrolysis reactor, such as an operating temperature of the reaction chambers, a volume of combustion fuel being consumed, a flow rate through the thermal pyrolysis reactor, an operating pressure of the reaction chamber(s), and/or the like.

EXAMPLES

The present technology is illustrated, for example, according to various aspects described below. Various examples of aspects of the present technology are described as numbered examples (1, 2, 3, etc.) for convenience. These are provided as examples and do not limit the present technology. It is noted that any of the dependent examples can be combined in any suitable manner, and placed into a respective independent example. The other examples can be presented in a similar manner.

1. A method for operating a hydrogen pyrolysis system, the method comprising:
receiving, from a supply of a hydrocarbon reactant, an input flow of the hydrocarbon reactant;
modifying the input flow to generate a modified input flow;
heating the modified input flow within a pyrolysis chamber of a pyrolysis reactor to drive a pyrolysis reaction in the modified input flow, wherein the pyrolysis reaction generates an output flow comprising solid carbon and hydrogen gas; and
removing at least a portion of the solid carbon from the output flow to purify the hydrogen gas in the output flow.

2. The method of example 1 wherein generating the modified input flow comprises adding solid carbon particulates to the input flow.

3. The method of example 2, further comprising recycling a portion of the solid carbon removed from the output flow into the modified input flow.

4. The method of any of examples 1-3 wherein:
the method further comprises directing a first portion of the input flow through a pre-reactor booster component, wherein the pre-reactor booster component is configured to generate carbon particulates via an initial pyrolysis reaction of the hydrocarbon reactant in the first portion of the input flow; and
generating the modified input flow comprises combining an output from the pre-reactor booster component with a second portion of the input flow in a feedstock mixer upstream from the pyrolysis reactor.

5. The method of example 4 wherein the pre-reactor booster component comprises a thermal-electrical heating component.

6. The method of any of examples 4 and 5 wherein the pre-reactor booster component comprises a plasma booster component.

7. The method of any of examples 1-6 wherein generating the modified input flow comprises exposing the input flow to a non-oxidative catalytic booster, and wherein the non-oxidative catalytic booster comprises one or more of W, Mo, Pt, Ru, Rh, Ir, Fe, Ni, Cu, Mn, Zn, and/or Bi.

8. The method of any of examples 1-7 wherein generating the modified input flow comprises doping the input flow with one or more reactive species, and wherein the one or more reactive species comprises one or more molecules of C2, C3, other higher hydrocarbons with a lower required energy for hydrogen abstraction, and/or a polyaromatic species.

9. The method of any of examples 1-8 wherein, after removing solid carbon from the output flow, the hydrogen gas comprises at least 75% of the output flow.

10. The method of any of examples 1-9, further comprising directing a portion of the hydrogen gas in the output flow to a combustion component thermally coupled to the pyrolysis chamber, wherein heating the pyrolysis chamber comprises combusting the portion of the hydrogen gas directed to the combustion component.

11. A pyrolysis system, comprising:
a combustion component;
a feedstock mixing component fluidly couplable to a supply of a reaction feedstock and a kinetic booster component, wherein the reaction feedstock includes a hydrocarbon reactant, and wherein the feedstock mixing component is configured to mix the reaction feedstock with a supplementary flow from the kinetic booster component to generate an input flow;
a pyrolysis reactor chamber fluidly coupled to the feedstock mixing component and thermally coupled to the combustion component, wherein the pyrolysis reactor chamber is configured to transfer heat from combustion by the combustion component to the input flow to generate an output flow comprising hydrogen gas and solid carbon; and
a carbon separation component coupled to the pyrolysis reactor chamber to separate at least a portion of the solid carbon from the hydrogen gas in the output flow.

12. The pyrolysis system of example 11, further comprising the kinetic booster component, the kinetic booster component comprising a recycling component fluidly coupled between the carbon separation component and the feedstock mixing component, wherein the recycling component is configured to direct carbon particulates from the carbon separation component to the feedstock mixing component to provide the supplementary flow.

13. The pyrolysis system of any of examples 11 and 12, further comprising the kinetic booster component, the kinetic booster component comprising a plasma booster component fluidly couplable to the supply of the reaction feedstock, wherein the plasma booster component is configured to modify a portion of the reaction feedstock upstream from the feedstock mixing component.
14. The pyrolysis system of example 13 wherein the plasma booster component is configured to heat the portion of the reaction feedstock to drive an initial pyrolysis reaction and generate carbon particulates.
15. The pyrolysis system of any of examples 13 and 14, further comprising a feedstock flow splitter fluidly couplable to the supply of the reaction feedstock upstream from the plasma booster component and the feedstock mixing component, wherein the feedstock flow splitter is configured to control a ratio of incoming reaction feedstock directed to the plasma booster component or directed directly to the feedstock mixing component.
16. The pyrolysis system of any of examples 11-15 wherein the supplementary flow from the kinetic booster component comprises one or more of solid carbon particulates, a polyaromatic species, and/or an oxidative species.
17. The pyrolysis system of any of examples 11-16, further comprising a feedstock pre-heating heat exchanger thermally coupled to an input line for the reaction feedstock upstream from the feedstock mixing component.
18. The pyrolysis system of any of examples 11-17 wherein the supplementary flow from the kinetic booster component comprises an oxidative catalytic booster comprising one or more of: air, water, steam, oxygen, carbon dioxide, and/or methanol.
19. A multi-stage pyrolysis system, comprising:
a plasma booster component fluidly couplable to a supply of a hydrocarbon feedstock, wherein the plasma booster component is configured to receive an input flow of the hydrocarbon feedstock and generate an intermediate input flow; and
a thermal pyrolysis component fluidly coupled to the plasma booster component to receive the intermediate input flow, wherein the thermal pyrolysis component comprises:
a combustion component fluidly couplable to a supply of combustion feedstock and configured to generate heat via a combustion of the combustion feedstock; and
a pyrolysis reactor chamber thermally coupled to the combustion component, wherein the pyrolysis reactor chamber is configured to transfer the heat from the combustion to hydrocarbons in the intermediate input flow to generate an output flow comprising hydrogen gas and solid carbon.
20. The multi-stage pyrolysis system of example 19 wherein the intermediate input flow comprises carbon particulates, and wherein the multi-stage pyrolysis system further comprises a controller configured to adjust an operating parameter of the plasma booster component to adjust a total surface area of the carbon particulates in the intermediate input flow.
21. The multi-stage pyrolysis system of any of examples 19 and 20 wherein the input flow is a first input flow, further comprising:
a hydrocarbon feedstock flow splitter fluidly couplable to the supply of the hydrocarbon feedstock upstream from the plasma booster component, wherein the hydrocarbon feedstock flow splitter is configured to split incoming feedstock into the first input flow and a second input flow; and
a hydrocarbon feedstock mixer fluidly coupled between the plasma booster component and the thermal pyrolysis component, wherein the hydrocarbon feedstock flow splitter is further configured to direct the second input flow directly to the hydrocarbon feedstock mixer, and wherein the hydrocarbon feedstock mixer is configured to mix the intermediate input flow with the second input flow upstream from the thermal pyrolysis component.
22. The multi-stage pyrolysis system of any of examples 19-21 wherein the plasma booster component is fluidly coupled to a supply of a gaseous catalyst, and wherein the plasma booster component is further configured to mix a volume of the gaseous catalyst with the hydrocarbon feedstock.

CONCLUSION

From the foregoing, it will be appreciated that specific embodiments of the technology have been described herein for purposes of illustration, but well-known structures and functions have not been shown or described in detail to avoid unnecessarily obscuring the description of the embodiments of the technology. To the extent any material incorporated herein by reference conflicts with the present disclosure, the present disclosure controls. Where the context permits, singular or plural terms may also include the plural or singular term, respectively. Moreover, unless the word “or” is expressly limited to mean only a single item exclusive from the other items in reference to a list of two or more items, then the use of “or” in such a list is to be interpreted as including (a) any single item in the list, (b) all of the items in the list, or (c) any combination of the items in the list. Furthermore, as used herein, the phrase “and/or” as in “A and/or B” refers to A alone, B alone, and both A and B. Additionally, the terms “comprising,” “including,” “having,” and “with” are used throughout to mean including at least the recited feature(s) such that any greater number of the same features and/or additional types of other features are not precluded. Further, the terms “generally, “approximately,” and “about” are used herein to mean within at least within 10% of a given value or limit. Purely by way of example, an approximate ratio means within 10% of the given ratio.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

From the foregoing, it will also be appreciated that various modifications may be made without deviating from the disclosure or the technology. For example, one of ordinary skill in the art will understand that various components of the technology can be further divided into subcomponents, or that various components and functions of the technology may be combined and integrated. In addition, certain aspects of the technology described in the context of particular embodiments may also be combined or eliminated in other embodiments.

Furthermore, although advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

We claim:

1. A pyrolysis system, comprising:

a combustion component;

a feedstock mixing component fluidly couplable to a supply of a reaction feedstock and a kinetic booster component, wherein the reaction feedstock includes a hydrocarbon reactant, and wherein the feedstock mixing component is configured to mix the reaction feedstock with a supplementary flow from the kinetic booster component to generate an input flow, wherein the supplementary flow is configured to provide a kinetic boost to the reaction feedstock;

a pyrolysis reactor chamber fluidly coupled to the feedstock mixing component and thermally coupled to the combustion component, wherein the pyrolysis reactor chamber is configured to transfer heat from combustion by the combustion component to the input flow to generate an output flow comprising hydrogen gas and solid carbon; and a carbon separation component coupled to the pyrolysis reactor chamber to separate at least a portion of the solid carbon from the hydrogen gas in the output flow.

2. The pyrolysis system of claim 1, further comprising the kinetic booster component, the kinetic booster component comprising a recycling component fluidly coupled between the carbon separation component and the feedstock mixing component, wherein the recycling component is configured to direct carbon particulates from the carbon separation component to the feedstock mixing component to provide the supplementary flow.

3. The pyrolysis system of claim 1, further comprising the kinetic booster component, the kinetic booster component comprising a plasma booster component fluidly couplable to the supply of the reaction feedstock, wherein the plasma booster component is configured to modify a portion of the reaction feedstock upstream from the feedstock mixing component.

4. The pyrolysis system of claim 3, further comprising a feedstock flow splitter fluidly couplable to the supply of the reaction feedstock upstream from the plasma booster component and the feedstock mixing component, wherein the feedstock flow splitter is configured to control a ratio of incoming reaction feedstock directed to the plasma booster component or directed directly to the feedstock mixing component.

5. The pyrolysis system of claim 1 wherein the supplementary flow from the kinetic booster component comprises one or more of solid carbon particulates, a polyaromatic species, an oxidative species, and/or one or more reactive species, wherein the one or more reactive species comprises one or more molecules of C2, C3.

6. The pyrolysis system of claim 1 wherein the supplementary flow from the kinetic booster component comprises an oxidative catalytic booster comprising one or more of: air, water, steam, oxygen, carbon dioxide, and/or methanol.

7. The pyrolysis system of claim 1, wherein the supplementary flow from the kinetic booster component comprises a non-oxidative catalytic booster, wherein the non-oxidative catalytic booster comprises one or more of W, Mo, Pt, Ru, Rh, Ir, Fe, Ni, Cu, Mn, Zn, and/or Bi.

8. The pyrolysis system of claim 1, wherein the feedstock mixing component and the kinetic booster component are upstream from the pyrolysis reactor chamber.

9. A multi-stage pyrolysis system, comprising:

a plasma booster component fluidly couplable to a supply of a hydrocarbon feedstock, wherein the plasma booster component is configured to receive an input flow of the hydrocarbon feedstock and generate an intermediate input flow; and a thermal pyrolysis component fluidly coupled to the plasma booster component to receive the intermediate input flow, wherein the thermal pyrolysis component comprises:

a combustion component fluidly couplable to a supply of combustion feedstock and configured to generate heat via a combustion of the combustion feedstock; and a pyrolysis reactor chamber thermally coupled to the combustion component, wherein the pyrolysis reactor chamber is configured to transfer the heat from the combustion to hydrocarbons in the intermediate input flow to generate an output flow comprising hydrogen gas and solid carbon.

10. The multi-stage pyrolysis system of claim 9 wherein the intermediate input flow comprises carbon particulates, and wherein the multi-stage pyrolysis system further comprises a controller configured to adjust an operating parameter of the plasma booster component to adjust a total surface area of the carbon particulates in the intermediate input flow.

11. The multi-stage pyrolysis system of claim 9 wherein the input flow is a first input flow, further comprising:

a hydrocarbon feedstock flow splitter fluidly couplable to the supply of the hydrocarbon feedstock upstream from the plasma booster component, wherein the hydrocarbon feedstock flow splitter is configured to split incoming feedstock into the first input flow and a second input flow; and a hydrocarbon feedstock mixer fluidly coupled between the plasma booster component and the thermal pyrolysis component, wherein the hydrocarbon feedstock flow splitter is further configured to direct the second input flow directly to the hydrocarbon feedstock mixer, and wherein the hydrocarbon feedstock mixer is configured to mix the intermediate input flow with the second input flow upstream from the thermal pyrolysis component.

12. The multi-stage pyrolysis system of claim 9 wherein the plasma booster component is fluidly coupled to a supply of an additional process gas, and wherein the plasma booster component is further configured to mix a volume of the additional process gas with the hydrocarbon feedstock.

13. The multi-stage pyrolysis system of claim 9, wherein the plasma booster component is upstream from the pyrolysis reactor chamber.

14. The multi-stage pyrolysis system of claim 9, wherein the plasma booster component is configured to inject energy into the reactant feedstock to generate the intermediate input flow.

* * * * *